US007827124B2

(12) United States Patent
McKinstry et al.

(10) Patent No.: US 7,827,124 B2
(45) Date of Patent: Nov. 2, 2010

(54) BRAIN-BASED DEVICE HAVING A CEREBELLAR MODEL FOR PREDICTIVE MOTOR CONTROL

(75) Inventors: Jeffrey L. McKinstry, San Diego, CA (US); Gerald M. Edelman, La Jolla, CA (US); Jeffrey L. Krichmar, Cardiff-by-the-Sea, CA (US)

(73) Assignee: Neurosciences Research Foundation, Inc., San Diego, CA (US)

( * ) Notice: Subject to any disclaimer, the term of this patent is extended or adjusted under 35 U.S.C. 154(b) by 880 days.

(21) Appl. No.: 11/646,930

(22) Filed: Dec. 27, 2006

(65) Prior Publication Data

US 2007/0194727 A1     Aug. 23, 2007

Related U.S. Application Data

(60) Provisional application No. 60/754,229, filed on Dec. 28, 2005.

(51) Int. Cl.
   *G06N 5/00* (2006.01)
(52) U.S. Cl. ............................................. 706/14; 706/45
(58) Field of Classification Search .................. 706/14, 706/23, 45; 607/2
   See application file for complete search history.

(56) References Cited

U.S. PATENT DOCUMENTS

| | | | |
|---|---|---|---|
| 5,136,687 A | | 8/1992 | Edelman |
| 6,169,981 B1 * | | 1/2001 | Werbos ........................ 706/23 |
| 6,581,048 B1 * | | 6/2003 | Werbos ........................ 706/23 |
| 6,665,562 B2 * | | 12/2003 | Gluckman et al. ............. 607/2 |
| 2005/0261803 A1 | | 11/2005 | Seth |

OTHER PUBLICATIONS

Schweighofer, et al., A Model of the Cerebellum in Adaptive Control of Saccadic Gain, Biological Cybernetics, 75, 1996, pp. 19-28.*
Adelson, E. H. et al., Spatiotemporal energy models for the perception of motion, Journal of the Optical Society of America, Feb. 1985, pp. 284-299, vol. 2, No. 2.
Carey, M. R., et al., Instructive signals for motor learning from visual cortical area MT, Nature Neuroscience, Jun. 2005, pp. 813-819, vol. 8, No. 6.
Chadderton, P., et al., Integration of quanta in cerebellar granule cells during sensory processing, Nature, Apr. 22, 2004, pp. 856-860, vol. 428.
Chichilnisky, E. J. et al., Temporal resolution of ensemble visual motion signals in primate retina, Journal of Neuroscience, Jul. 30, 2003, pp. 6681-6689, vol. 23, No. 17.

(Continued)

*Primary Examiner*—Wilbert L Starks, Jr.
(74) *Attorney, Agent, or Firm*—Fliesler Meyer LLP

(57) ABSTRACT

A mobile brain-based device (BBD) includes a mobile platform with sensors and effectors, which is guided by a simulated nervous system that is an analogue of the cerebellar areas of the brain used for predictive motor control to determine interaction with a real-world environment. The simulated nervous system has neural areas including precerebellum nuclei (PN), Purkinje cells (PC), deep cerebellar nuclei (DCN) and an inferior olive (IO) for predicting turn and velocity control of the BBD during movement in a real-world environment. The BBD undergoes training and testing, and the simulated nervous system learns and performs control functions, based on a delayed eligibility trace learning rule.

11 Claims, 11 Drawing Sheets

OTHER PUBLICATIONS

Edelman, G. M., et al., Synthetic neural modeling applied to a real-world artifact, Proceedings of the National Academy of Sciences USA, Aug. 1992, pp. 7267-7271. vol. 89.

Egelhaaf, M., et al., Computational structure of a biological motion-detection system as revealed by local detector analysis in the fly's nervous system, Journal of the Optical Society of America, Jul. 1989, pp. 1070-1087, vol. 6, No. 7.

Fleischer, J. G., et al., A neurally controlled robot competes and cooperates with humans in Segway soccer, Proceedings of the 2006 IEEE International Conference on Robotics and Automation, May 2006, pp. 3673-3678, Orlando, FL.

Geisler, W. S., Motion streaks provide a spatial code for motion direction, Nature, Jul. 1, 1999, pp. 65-69, vol. 400.

Grossberg, S., The link between brain learning, attention, and consciousness, Consciousness and Cognition, 1999, pp. 1-44, vol. 8.

Grossberg, S., et al., A neural model of motion processing and visual navigation by cortical area MST, Cerebral Cortex, Dec. 1999, pp. 878-895, vol. 9.

Hansel, C., et al., Beyond parallel fiber LTD: the diversity of synaptic and non-synaptic plasticity in the cerebellum, Nature Neuroscience, May 2001, pp. 467-475, vol. 4, No. 5.

Ijspeert, A. J., et al., Simulation and robotics studies of salamander locomotion—applying neurobioloical principles to the control of locomotion in robots, Neuroinformatics, 2005, pp. 171-195, vol. 3.

Ito, M. et al., Climbing fibre induced depression of both mossy fibre responsiveness and glutamate sensitivity of cerebellar purkinje cells, Journal of Physiology, 1982, pp. 113-134, vol. 324.

Kawato, M., et al., A computational model of four regions of the cerebellum based on feedback-error learning, Biological Cybernetics, 1992, pp. 95-103, vol. 68.

Kitazawa, S., et al., Cerebellar complex spikes encode both destinations and errors in arm movements, Nature, Apr. 2, 2998, pp. 494-497, vol. 392.

Krekelberg, B., et al., Neural correlates of implied motion, Nature, Aug. 2003, pp. 674-677, vol. 424.

Krichmar, J. L., et al., Machine psychology: autonomous behavior, perceptual categorization and conditioning in a brain-based device, Cerebral Cortex, Aug. 2002, pp. 818-830, vol. 12.

Krichmar, J. L., et al., Characterizing functional hippocampal pathways in a brain-based device as it solves a spatial memory task, Proceedings of the National Academy of Sciences USA, Feb. 8, 2005, pp. 2111-2116, vol. 102, No. 6.

Lappe, M., A model of the combination of optic flow and extraretinal eye movement signals in primate extrastriate visual cortex—Neural model of self-motion from optic flow and extraretinal cues, Neural Networks, 1998, pp. 397-414,vol. 11.

Mauk, M. D., et al., Cerebellar function: coordination, learning or timing? Current Biology, 2000, pp. R522-R525, vol. 10.

Medina, J. F. et al., Computer simulation of cerebellar information processing, Nature Neuroscience Supplement, Nov. 2000, pp. 1205-1211, vol. 3.

Medina, J. F., et al., The representation of time for motor learning, Neuron, Jan. 6, 2005, pp. 157-167, vol. 45.

Ohyama, T., et al., Trying to understand the cerebellum well enough to build one, Ann. New York Academy of Sciences, 2002, pp. 425-438, vol. 978.

Pfeifer, R. et al., Sensory-motor coordination: the metaphor and beyond, Robotics and Autonomous Systems, 2007, pp. 157-178, vol. 20.

Prescott, T. J., et al., A robot model of the basal ganglia: behavior and intrinsic processing, Neural Networks, 2006, pp. 31-61, vol. 19.

Scudder, C. A., Role of the fastigal nucleus in controlling horizontal saccades during adaptation, Ann. New York Academy of Sciences, 2002, pp. 63-78, vol. 978.

Seth, A. K., et al., Visual binding through reentrant connectivity and dynamic synchronization in a brain-based device, Cerebral Cortex, Nov. 2004, pp. 1185-1199, vol. 14, No. 11.

Seth, A. K., et al., Texture discrimination by an autonomous mobile brain-based device with whiskers, IEEE Conference on Robotics and Automation, Apr. 2004, pp. 4925-4930, New Orleans, LA.

Seth, A. K., et al., Spatiotemporal processing of whisker input supports texture discrimination by a brain-based device, in Animals to Animats 8: Proceedings of the Eighth International Conference on the Simulation of Adaptive Behavior, eds. Schaal, et al., 2004, pp. 130-139, The MIT Press, Cambridge, MA.

Sporns, O. et al., Neuromodulation and plasticity in an autonomous robot, Neural Networks, 2002, pp. 761-774, vol. 15.

Uchibe, E., Competitive-cooperative-concurrent reinforcement learning with importance sampling, in Animals to Animats 8: Proceedings of the Eighth International Conference on the Simulation of Adaptive Behavior, eds. Schaal, S., et al., 2004, The MIT Press, Cambridge, MA.

Van Santen, J. P., et al. Elaborated Reichardt detectors, Journal of the Optical Society of America, Feb. 1985, pp. 300-321, vol. 2, No. 2.

Weng, J., Developmental robotics: theory and experiments, International Journal of Humanoid Robotics, 2004, pp. 199-236, vol. 1, No. 2.

Wolpert, D., et al., Internal models in the cerebellum, Trends in Cognitive Sciences, Sep. 1998, pp. 338-347, vol. 2, No. 9.

Wray, J., et al., A model of color vision based on cortical reentry, Cerebral Cortex, Sep./Oct. 2006, pp. 701-716, vol. 6.

Yamamoto, K., et al., Computational studies on acquisition and adaptation of ocular following responses based on cerebellar synaptic plasticity, Journal of Neurophysiology, Mar. 2002, pp. 1554-1571, vol. 87.

Zemel, R. S. et al., A model for encoding multiple object motions and self-motion in area MST of primate visual cortex, Journal of Neuroscience, Jan. 1, 1998, pp. 531-547, vol. 18, No. 1.

Search Report and Search Opinion dated Apr. 9, 2010 for European Application No. 06848895.6, 7 pages.

Krichmar, J.L. et al., Spatial navigation and causal analysis in a brain-based device modeling cortical-hippocampal interactions, Neuroinformatics, Sep. 1, 2005, vol. 3, No. 3, pp. 197-222.

Mehrtash, N. et al., Synaptic plasticity in spiking neural networks: a system approach, IEEE Transactions on Neural Networks, Sep. 1, 2003, vol. 14, No. 5, pp. 980-992.

* cited by examiner

Fig. 1A
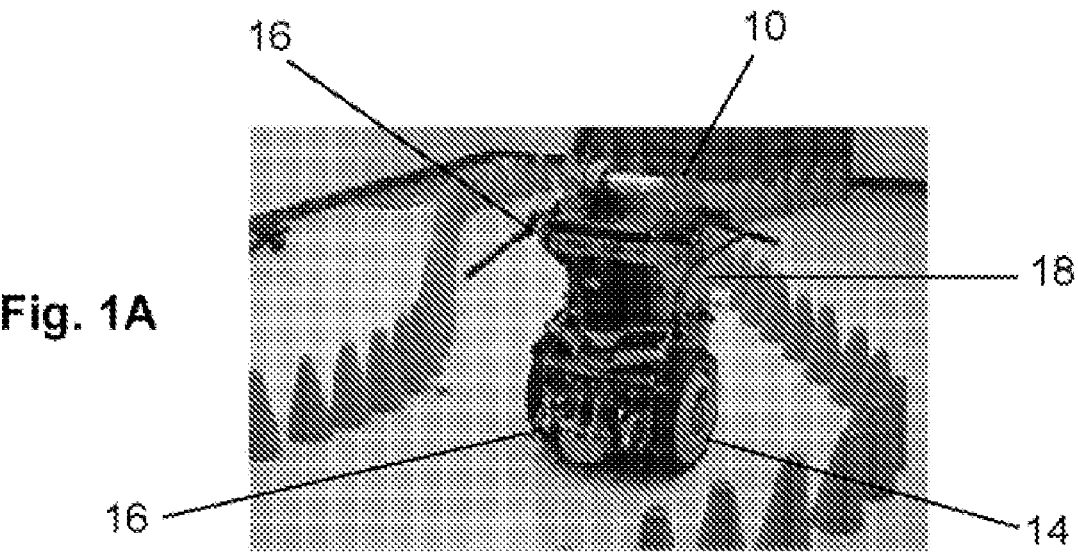
Fig. 1B
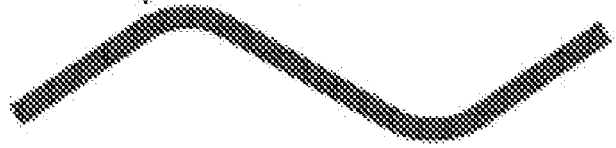
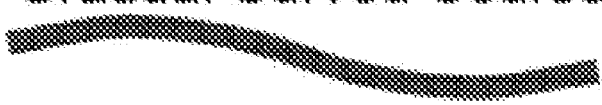

Fig. 3A Learning Phase
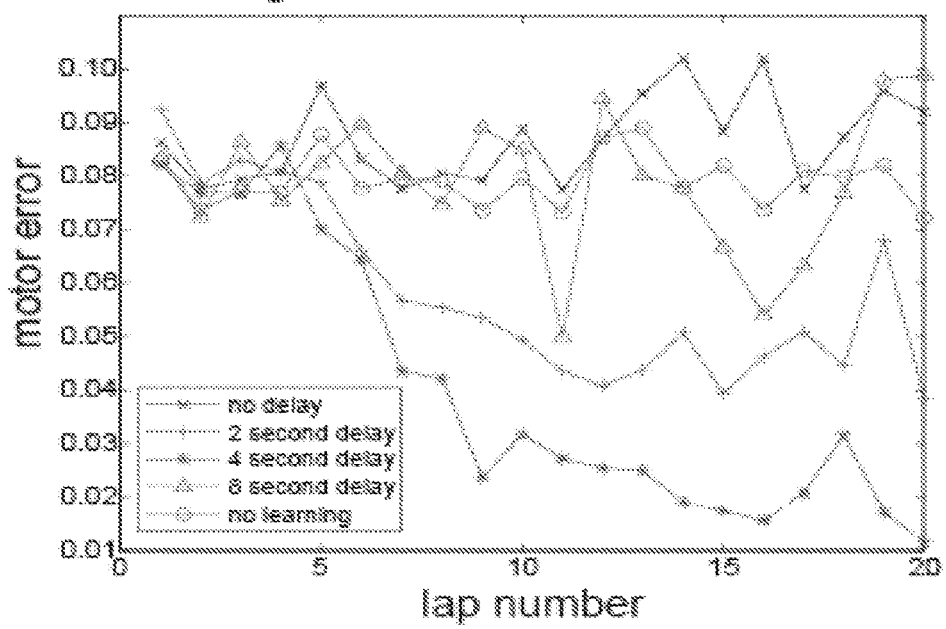
Fig. 3B Testing Phase (visual input only)
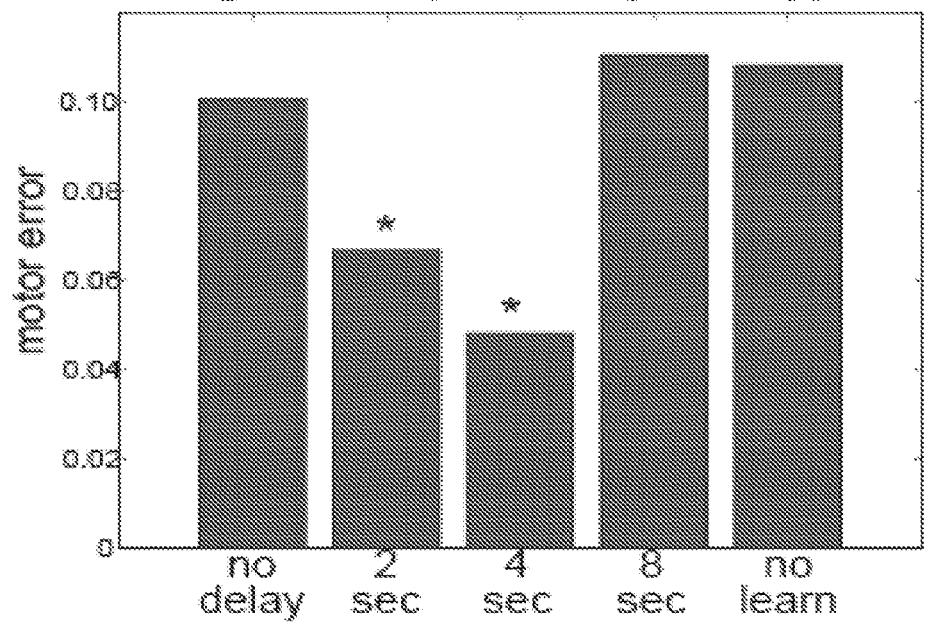

Fig. 5A *MT Responses During Turns to the Left*
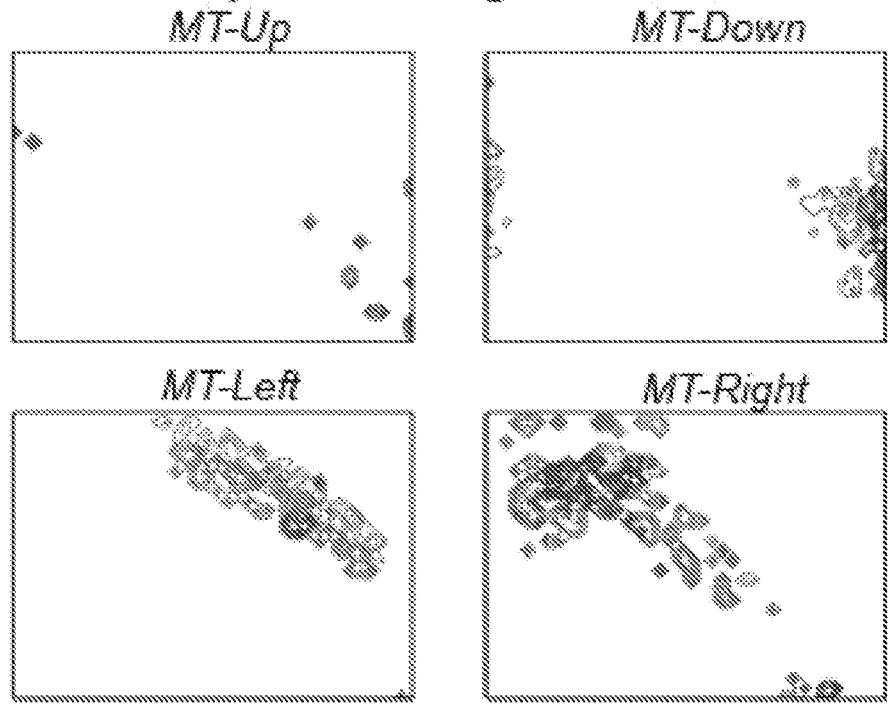
Fig. 5B *MT Responses During Turns to the Right*
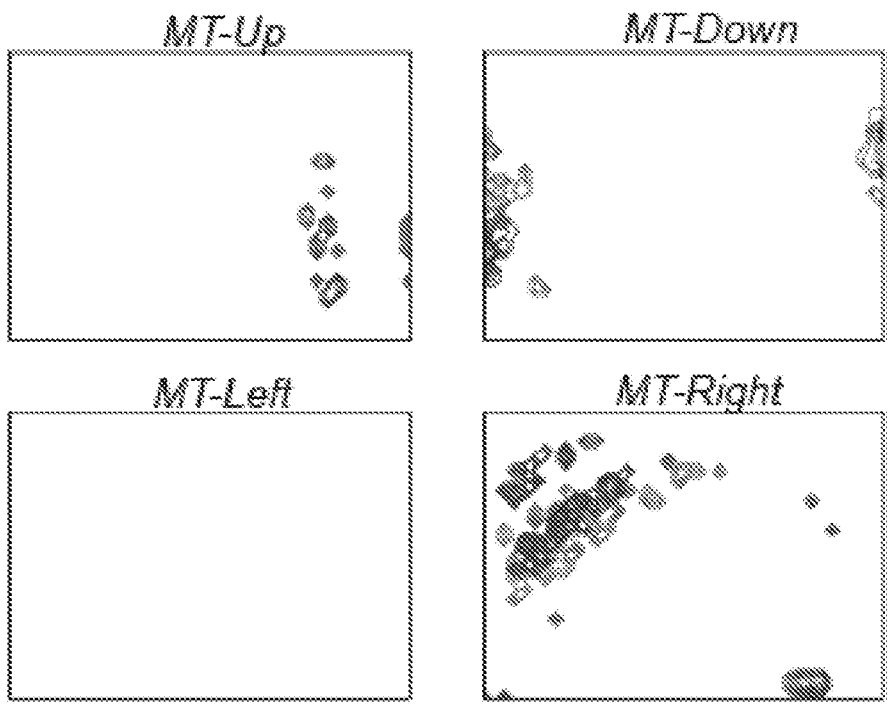

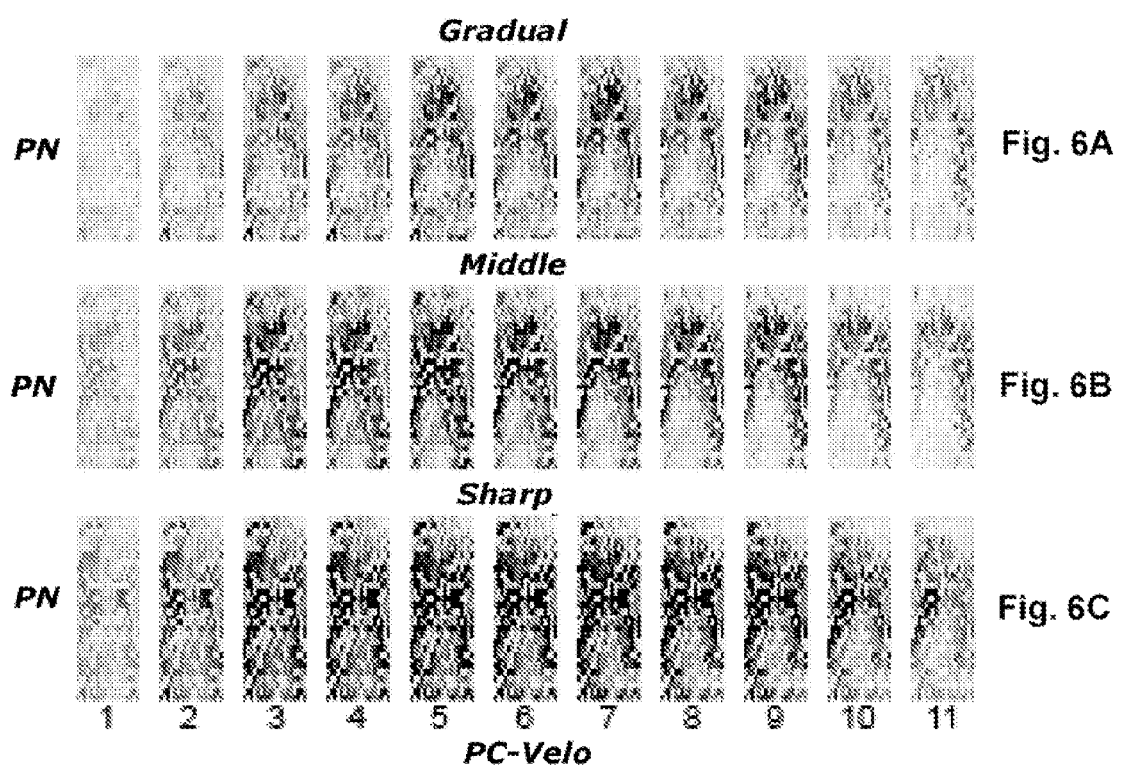

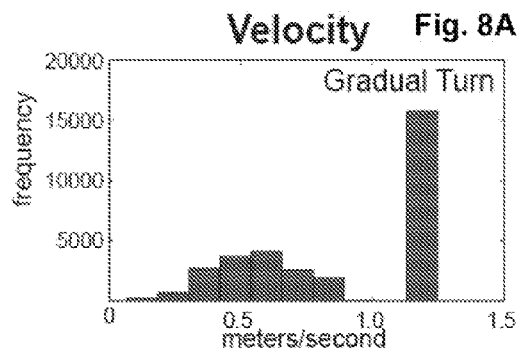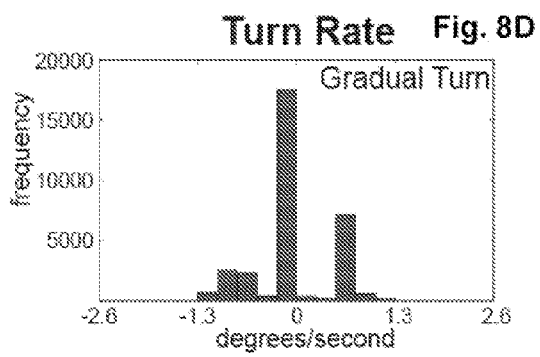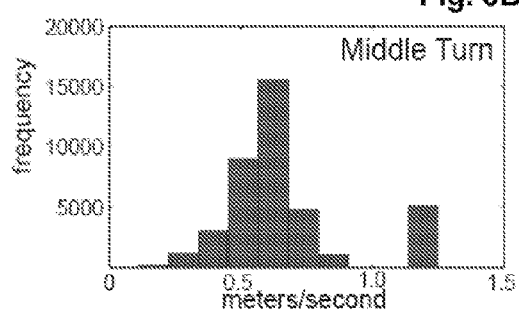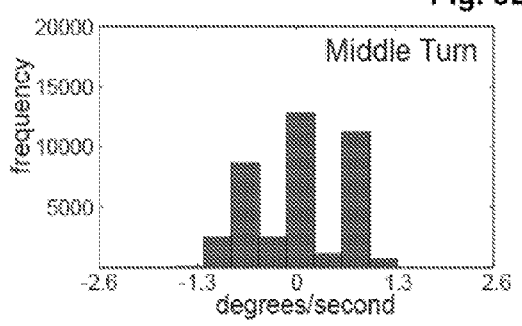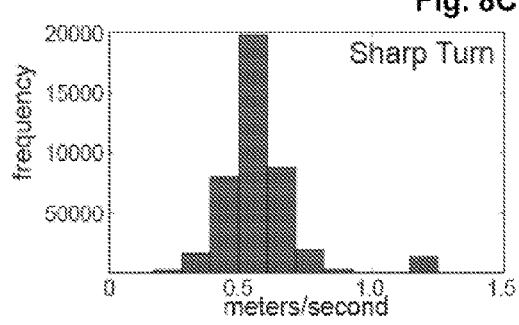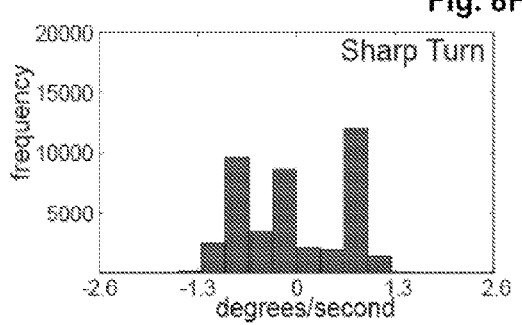

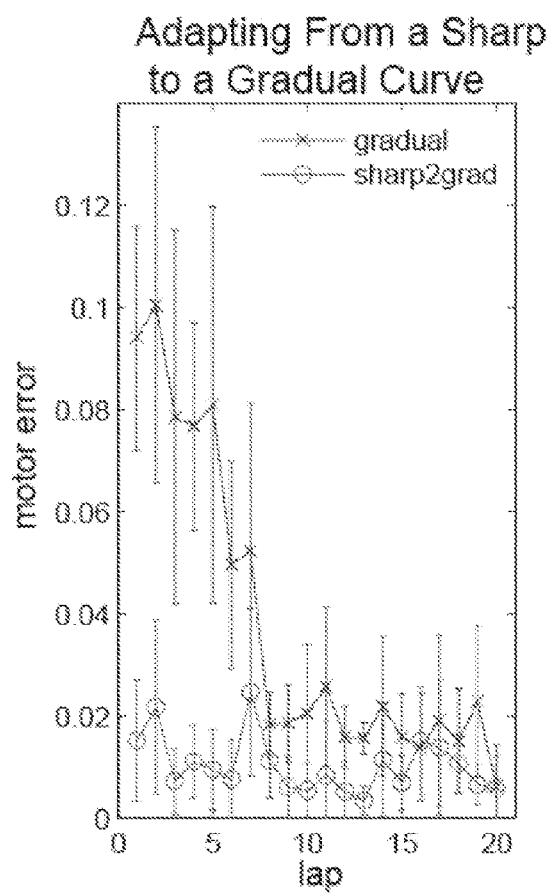 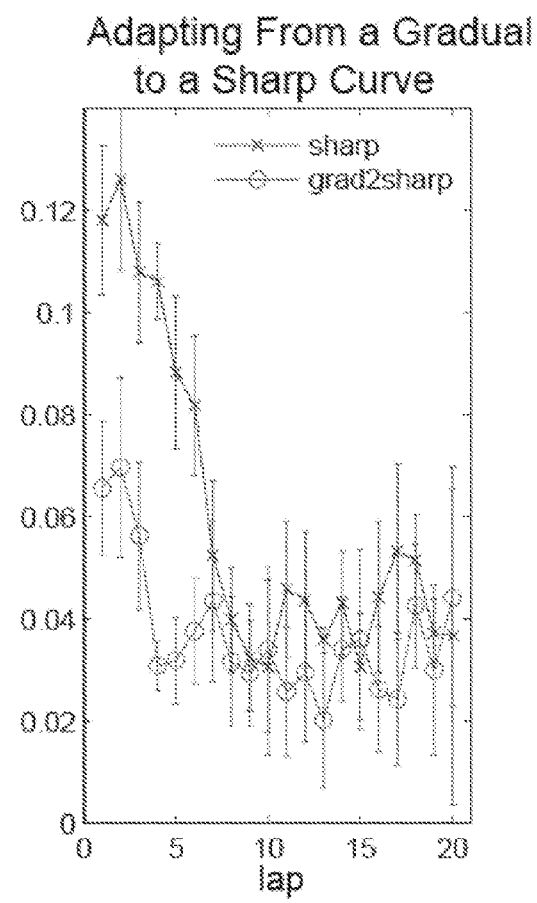
Fig. 9A
Fig. 9B

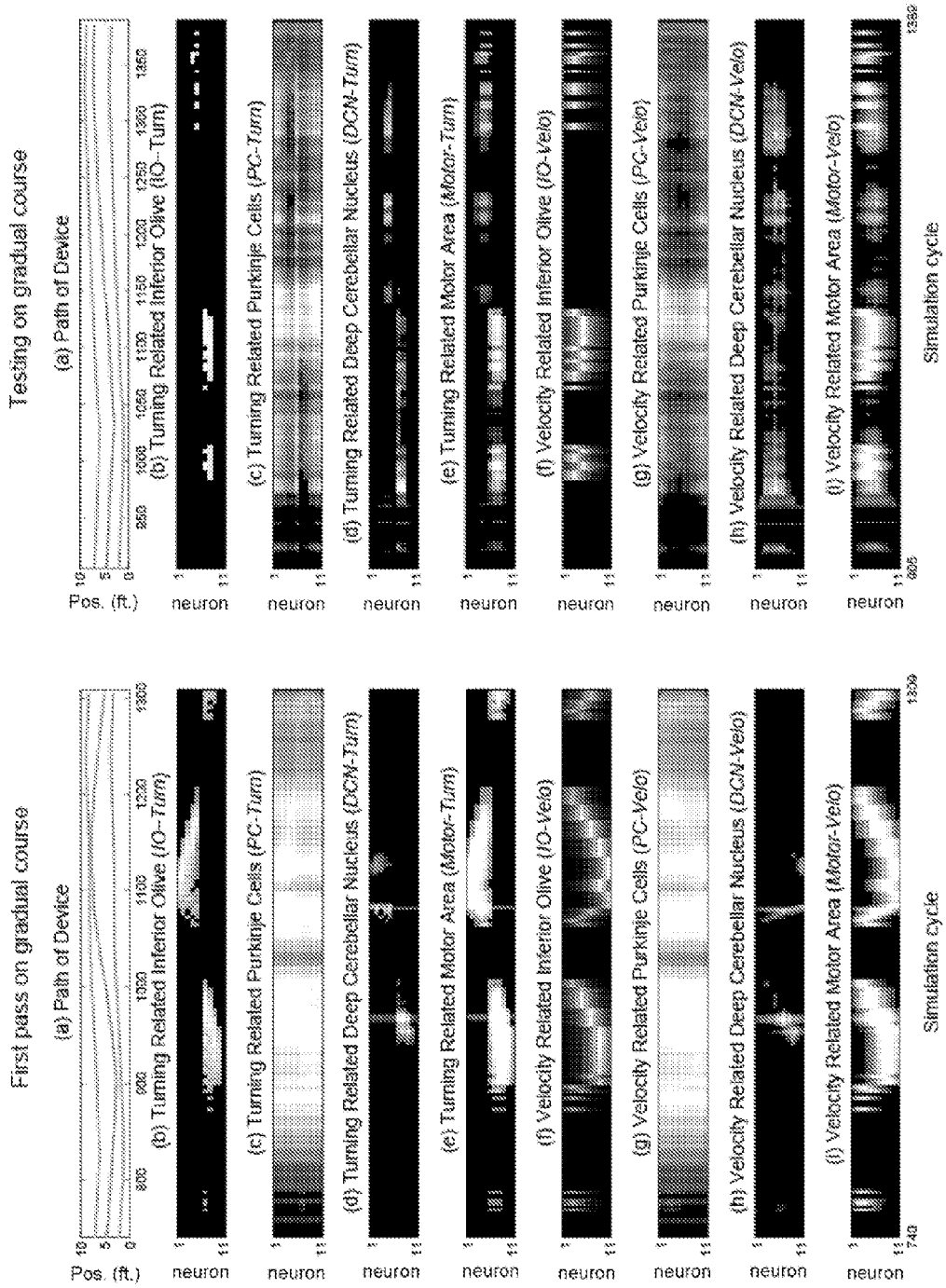

BRAIN-BASED DEVICE HAVING A CEREBELLAR MODEL FOR PREDICTIVE MOTOR CONTROL

PRIORITY CLAIM

This application claims priority under 35 U.S.C. 119(e) to U.S. Provisional Patent Application No. 60/754,229, filed Dec. 28, 2005, entitled "A Cerebellar Model for Predictive Motor Control Tested in a Brain-Based Device," by Jeffrey L. McKinstry et al., which application is incorporated herein by reference.

STATEMENT REGARDING FEDERALLY SPONSORED RESEARCH AND DEVELOPMENT

This invention was made with Government support under grant N00014-03-1-0980 awarded by the Office of Naval Research. The United States Government has certain rights in the invention.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to the field of brain-based devices having simulated nervous systems for predictive motor control in a real world environment.

BACKGROUND OF THE INVENTION

A brain-based device (BBD) is a device that has a sensing system for receiving information, effectors that enable the device to move about, and a simulated nervous system which controls movement of the effectors in response to input from the sensing system to guide the behavior of the brain-based device in a real-world environment. The sensing system may include sensors which receive image and other information from the real-world environment in which the device moves. The simulated nervous system may be implemented as a computer-based system which receives and processes the sensed information input to the brain-based device and outputs commands to the effectors to control the behavior of the device (BBD) in the real-world environment.

The simulated nervous system, while implemented in a computer-based system, emulates the human brain rather than a programmed computer which typically follows a set of precise executable instructions or which performs computations. That is, the brain is not a computer and follows neurobiological rather than computational principles in its construction. The brain has special features or organization and functions that are not believed to be consistent with the idea that it follows such a set of precise instructions or that it computes in the manner of a programmed computer. A comparison of the signals that a brain receives with those of a computer shows a number of features that are special to the brain. For example, the real world is not presented to the brain like a data storage medium storing an unambiguous series of signals that are presented to a programmed computer. Nonetheless, the brain enables humans (and animals) to sense their environment and move in a real-world environment.

The brain's cerebellum is known to be critical for accurate adaptive control and motor learning. One theory of the cerebellum, consistent with much of the neurophysiological, behavioral, and imaging data regarding motor control, proposes that the cerebellum learns to replace reflexes with a predictive controller. This produces a correct motor control signal and circumvents less adaptive reflexive responses. Numerous adaptive cerebellar functions, including eye-blink conditioning, the vestibular-ocular reflex, smooth pursuit eye movement, spinal nociceptive withdrawal reflex, grip force adjustments, arm movements, and saccadic eye movements, are susceptible to this type of motor control. At present, debate about the mechanisms responsible for this predictive capability include proposals for delay lines, spectral timing, oscillators, or dynamic recurrent activity in granule cells.

One current theory proposes that a feedback motor command from a primitive feedback controller (or reflex) is used as an error signal delivered to the cerebellum via climbing fibers from the inferior olive of the brain. In addition, synaptic eligibility traces in the cerebellum has also been proposed as a mechanism for such motor learning. Yet another theory proposes an eligibility trace that is triggered by motion onset and peaks at 150-200 ms with durations of 1-2 seconds.

SUMMARY OF THE INVENTION

The present invention is based on a different mechanism. In the present invention, a learning rule is incorporated in which the synapses onto a Purkinje cell (PC) or onto a cell in the deep cerebellar nuclei (DCN) of the cerebellum become eligible for plasticity only after a fixed delay from the onset of suprathreshold presynaptic activity. These synaptic strength changes only occur at eligible synapses when the climbing fibers from the inferior olive (IO) of the cerebellum signal a motor error. This delayed eligibility trace learning rule shapes cerebellar responses functioning to anticipate and avoid an impending motor error.

Thus, the present invention is a physical, mobile brain-based device (BBD) guided by a simulated nervous system of the cerebellar incorporating features of vertebrate neuroanatomy and neurophysiology that determine the BBD's interaction with the real-world environment.

The simulated nervous system of the BBD provides for predictive motor control enabling the BBD to move in a real-world environment. The simulated nervous system contains simulated neural areas analogous to the cerebellar region of the brain, and includes a precerebellar nuclei (PN), Purkinje cells (PC-Turn and PC-Velo), deep cerebellar nuclei (DCN-Turn and DCN-Velo), and an inferior olive (IO-Turn and IO-Velo) in which "Turn" refers to turning and "Velo" refers to velocity of the BBD. The brain-based device BBD also has a camera providing visual input that is projected onto a simulated cortical area (MT) of the brain, and infrared (IR) proximity detectors which drive neuronal units in the inferior olive (IO), which in turn drive simulated motor neurons for turning (Motor-Turn) and braking (Motor-Velo).

The physical mobile brain-based device BBD, as it is moving and interacting in a real-world environment, undergoes a training stage and a testing stage. During the training or learning stage, the BBD moves along a given path or course and motor error is signaled to the simulated nervous system by the infrared (IR) proximity detectors when the BBD is near an obstacle in the course, causing the BBD to reflexively turn away from the obstacle and slow down in the presence of the obstacle. The motor error signal, which initiates braking and movement away from obstacles, also causes changes in synaptic efficiency between the simulated cortical area (MT) and the cerebellar neuronal units (PN) (PC) (IO). After the learning stage and during the testing stage, visual motion cues alone are sufficient to drive the brain-based device BBD smoothly down the center of the given course. During the testing stage, the cortical area (MT) input that predicts potential errors results in the brain-based device BBD moving away from obstacles well before the error signal can be generated.

Consequently, the delayed eligibility trace rule of the present invention accounts for the predictive ability of the cerebellum in motor control tasks under real-world conditions. The cerebellum can learn to replace an arbitrary reflexive neural control system with a more adaptive, predictive controller or "preflex".

BRIEF DESCRIPTION OF THE DRAWINGS

FIG. 1A is a pictorial view of a physical, mobile brain-based device movable in a path or course dictated by the orange cones.

FIG. 1B shows the layout of different courses the brain-based device of FIG. 1A navigates.

FIG. 3A is a graph of the training or learning phase of the brain-based device of FIG. 1A while on the middle curved course of FIG. 1B.

FIG. 3B is a graph of the testing phase of the brain-based device while on the middle curved course of FIG. 1B.

FIG. 5A are illustrations of different responses by the neuronal units in area MT of the neuroanatomy of FIG. 2 to left turns made by the brain-based device of FIG. 1A over the respective sharp, middle and gradual curved courses of FIG. 1B.

FIG. 5B are illustrations of different responses by the neuronal units in area MT of the neuroanatomy of FIG. 2 to right turns made by the brain-based device of FIG. 1A over the respective sharp, middle and gradual curved courses.

FIGS. 6A-6C illustrate respective matrices of synaptic weights from the precerebellar nuclei (PN) to the Purkinje cells (PC) for velocity control (PC-Velo) of the neuroanatomy of FIG. 2 after the training phases of the brain-based device of FIG. 1A over the respective gradual, middle and sharp curved courses.

FIGS. 8A-8C are histograms of the distribution of the velocity motor commands for the gradual, middle and sharp curved courses of FIG. 1B.

FIGS. 8D-8F are histograms of the distribution of the turn commands for the gradual, middle and sharp curved courses of FIG. 1B.

FIGS. 9A-9B show, respectively, the adaptation of the brain-based device from the sharp curved course to the gradual curved course and from the gradual curved course to the sharp curved course.

FIGS. 11A(a)-(i) illustrate responses from selected neural areas while the brain-based device of FIG. 1A is on the gradual curved course of FIG. 1B during a first pass, in which the responses are activated by collisions or near-collisions of the cones shown in FIG. 1A.

FIGS. 11B(a)-(i) illustrate responses from selected neural areas on the same course shown in FIG. 11A(a) at the end of a training.

DETAILED DESCRIPTION

FIG. 1A is a pictorial view of a brain-based device (BBD) 10 of the present invention which includes a physically instantiated mobile device that can explore its environment and develop adaptive behavior while experiencing it. The brain-based device BBD 10 includes a simulated nervous system 12 (see FIG. 2) for guiding the BBD 10 in its real-world environment. In one embodiment, the simulated nervous system 12 is embodied as a cluster of embedded Beowulf computers described more fully below.

The BBD 10, as shown in FIG. 1B, is movable in a real-world environment over several types of paths or courses including a sharp curved course, a middle curved course, and a gradual curved course. These three courses are set up using the orange cones shown in FIG. 1A. As will be further described, the BBD 10 will move over these three courses, respectively, during a training stage or phase and during a testing stage or phase.

As shown in FIG. 1A, the brain-based device 10, in one embodiment, is built on a Segway Robotic Mobility Platform or RMP shown generally at 14, which is a commercially available robotic version of the Segway Human Transporter manufactured by Segway, Inc., Bedford, N.H. The BBD 10 receives sensory input from a color camera, a laser rangefinder, and banks of short-range IR detectors, all as shown generally at 16, that are mounted low around the BBD 10 to detect nearby objects as it traverses the respective courses of FIG. 1B. An aluminum chassis 18 on the base of the BBD 10 contains a Beowulf cluster of six compact Pentium IV PCs, manufactured by Intel Corporation, Santa Clara, Calif., and enough battery capacity to power the BBD for approximately 45 minutes.

Figure 2:
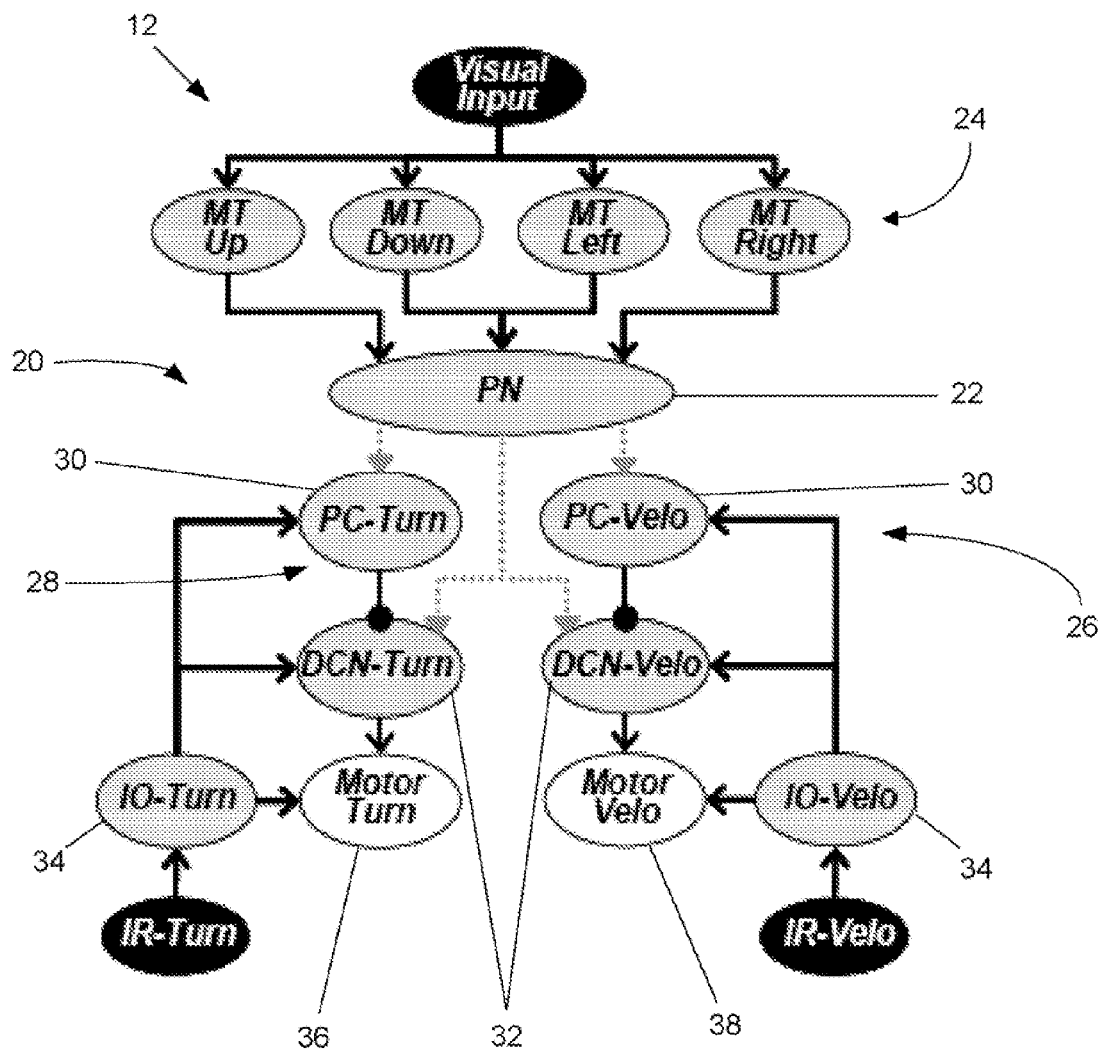
FIG. 2 is a schematic of the regional and functional neuroanatomy of the simulated nervous system of the brain-based device of FIG. 1A.

FIG. 2 shows a high-level diagram of the simulated nervous system 12 including the various neural areas and the arrangement of synaptic connections. Specific parameters relating to each area and to patterns of connectivity are described below and in relation to Tables S1 and S2.

The simulated nervous system 12 is of the cerebellum 20 and has precerebellar nuclei (PN) 22 that receive input from visual cortical areas (MT) 24 indicated by neural pathways (MT→PN). The precerebellar nuclei (PN) 22 outputs to the cerebellum region 26 indicated by neural pathways (PN→PC, PN→DCN), which includes a cerebellar cortex 28 containing Purkinje cells (PC) 30 that inhibit deep cerebellar nuclei (DCN) 32 for turning and velocity control (PC→DCN) of the BBD 10, and an inferior olive (IO) 34 that simulates climbing fiber input to the cerebellum (IO→PC, IO→DCN).

More specifically, FIG. 2 shows a schematic of the simulated regional and functional neuroanatomy 12 of the BBD 10. The gray ellipses shown in FIG. 2 denote different neural areas, the black ellipses denote sensory input areas, and the white ellipses denote motor areas. Arrows shown in FIG. 2 denote synaptic projections from one area to another. Black arrows ending in open arrowheads denote excitatory connections, black arrows ending in a circular endpoint denote inhibitory connections, and gray arrows ending in filled arrowheads with dotted lines denote plastic connections. Visual input from a camera shown generally at 16 on the BBD 10 of FIG. 1A projects to the cortical area (MT) 24. The system 12 includes precerebellar nuclei (PN) 22, Purkinje cells PC 30 (PC-Turn and PC-Velo), deep cerebellar nuclei DCN 32 (DCN-Turn and DCN-Velo), and input from the inferior olive IO 34 (IO-Turn and IO-Velo), where "Turn" refers to turning and "Velo" refers to velocity of the BBD. Neuronal units in the inferior olive IO 34 are driven by the IR proximity detectors shown generally at 16 (FIG. 1A), which in turn drive motor neurons for turning 36 (Motor-Turn) and braking 38 (Motor-Velo). Those motor neurons are also driven by the deep cerebellar nuclei 32 (DCN) as described further below. Each area contains neuronal units that can be either excitatory or inhibitory, each of which represents a local population of neurons [see Edelman, G. M. (1987) *Neural Darwinism: The Theory of Neuronal Group Selection* (Basic Books, Inc., New York], in which the mean firing rate variable of each unit corresponds to the average activity of a group of roughly 100 real neurons during a time period of approximately 40 milliseconds. Further neural model implementation details are described below.

The BBD 10 has three basic innate behaviors: Continue moving forward, Avoid large obstacles such as walls or people, and avoid Head-On collisions with the cones shown in FIG. 1A. In the Continue behavior, the BBD 10 moves forward in a straight line at a maximum of, for example, 1.25 meters per second or approximately 3 miles per hour unless the Head-On behavior, Avoid behavior, or activity of the neural simulation 12 causes the BBD 10 to slow down and/or turn. When the simulated nervous system 12 intervenes, motor neural areas are converted into wheel commands as further described below. The motor neural areas could be activated by the input from IR detectors shown generally at 16 or by visuomotor pathways. Continue is the default behavior for the simulation.

The laser range finder shown generally at 16 on board the BBD 10 can detect obstacles up to 20 meters in a 180 degree arc that are 2.5 feet high, which is above the height of the cones marking the courses as shown in FIGS. 1A, 1B. If an object is detected within, for example, 1 meter of the BBD 10, an Avoid behavior is initiated and the BBD 10 rotates in place until the laser range finder 16 detects no obstacles closer than a meter. After the Avoid behavior is completed, the BBD 10 initiates the Continue behavior. In general, when the BBD 10 completes a lap on a given course marked by the cones shown in FIG. 1A, it would typically be close to a wall; Avoid causes the BBD 10 to turn around nearly 180 degrees and then proceed along the given course in the opposite direction.

If the IR proximity detectors 16 signal the presence of cones directly in front and within 6 inches of the BBD 10, the Head-On behavior is initiated and the BBD 10 backs up until it is clear of the cones. After clearing the cones, the Continue behavior is initiated and the IR detectors 16 or the visuomotor system 16 would typically trigger a neural motor response to maneuver away from the cones and proceed down the given course, shown in FIGS. 1A, 1B.

Synaptic Plasticity and the Delayed Eligibility Trace Learning Rule. Synaptic strengths are subject to modification according to a synaptic rule that depends on the pre-, post-synaptic, and inferior olive (IO) activities. Details of changes in neuronal unit activity and parameter details are described below, but the following equations are based on these details.

Synaptic changes are given by:

$$\Delta c_{ij}(t+1) = \eta_{Si}(t) * \text{trace}_{eligibility}(t) * (IO_i(t) - 0.02);$$

where $c_{ij}$ is the connection strength from unit j to unit i, $s_i(t)$ is the activity of the post-synaptic unit, $IO_i(t)$ is the activity of the inferior olive unit corresponding to unit i, $\eta$ is a fixed learning rate, and $\text{trace}_{eligibility}(t)$ is the eligibility trace of synapse j. The eligibility trace described below determines the amount of efficacy change at a specific synapse for a given time. This learning rule supports both potentiation and depression at PC and DCN synapses. When $\eta$ is negative (e.g. in PN→PC synapses), the learning rule induces depression when the inferior olive (IO) is active above a baseline firing rate, and potentiation when the inferior olive (IO) is below a baseline. This learning rule supports extinction of learned responses when the error from the inferior olive (IO) is absent.

In the model of the present invention, the change in synaptic efficacy is based on the delayed eligibility trace rule indicated above and described more fully below, according to which an eligibility trace ($\text{trace}_{eligibility}$) determines the amount of synaptic change at that synapse when eligible:

$$\text{trace}_{eligibility}(t+1) = \begin{cases} 0 & \text{if } s(t-\Delta) < \sigma \text{ for all } \Delta < \text{delay}, \\ s(t-\text{delay}) & \text{if } s(t-\text{delay}) \geq \sigma, \\ 0.90 * \text{trace}_{eligibility}(t) & \text{otherwise} \end{cases},$$

where s(t) is the presynaptic input to the synapse, and $\sigma=0.15$, $\Delta$ is a time offset from the previous simulation cycle. When presynaptic input exceeds a threshold, the synapse becomes eligible for modification after a set delay, at which time, the eligibility declines exponentially. The delay in the learning stages of the BBD 10 as described below is varied to investigate the effect of different delay periods. Delay periods investigated are 0, 2, 4, and 8 seconds.

Vision and Motion Processing. Visual information, as already indicated, is provided to the BBD 10 by a camera shown generally at 16 that captures images at 30 frames per second. Details describing visual preprocessing are described below. In the training/testing examples of the present invention, neuronal units of the simulated nervous system 12 that respond to the presence of red-orange color provide visual input into the system 12 (Visual Input in FIG. 2).

Visual streaks or blurring provide motion information. Streaks and blurring of the visual image in the BBD 10 are realized by a combination of neuronal persistence and reciprocal connections between visual neural areas. Horizontal and vertical edges, as well as direction selective responses are derived from the blurred visual image.

Activation of a neuronal unit in the simulated cortical area MT is a result of coincident activity of an orientation-selective neuronal unit with a direction-selective neuronal unit. For example, the neuronal unit MT-Down shown in FIG. 2 at a given receptive field is active when a vertical orientation neuronal unit and a downward motion selective unit are co-active at the same receptive field, as described more fully below in relation to Table S2.

Motor Output. Motion of the BBD 10 is controlled by velocity (meters/sec) and turn rate (degrees/sec) commands. At a given turn rate, the radius of the turn is a function of velocity; i.e. a turn rate with zero velocity results in the BBD 10 turning in place and the same turn rate at a high velocity results in a wide turn. The BBD 10 turn rate may be set based on the activity of Motor-Turn 36 (see FIG. 2) (e.g. activity on the left of the BBD 10 results in a turn to the right). The activity of Motor-Turn 36 is affected by IR input (IR-Turn) via the inferior olive (IO-Turn→Motor-Turn in FIG. 2) and by visual input (Visual Input) via the cerebellum (DCN-Turn→Motor-Turn in FIG. 2). The speed of the BBD 10 is controlled based on the activity of the Motor-Velo area 38. When there is no motor activity, the speed is set to a maximum of 1.25 meters/sec. The Motor-Velo area then slows down the BBD 10 based on the number of IR detectors shown generally at 16 signaling an obstacle; that is, the more IR detectors 16 that are activated, the slower the velocity. Motor-Velo 38 activity is affected by IR-Velo input via the inferior olive (IO-Velo→Motor-Velo in FIG. 2) and by visual input (Visual Input) via the cerebellum (DCN-Velo→Motor-Velo in FIG. 2).

Computation. The neural simulation of the simulated nervous system 12 is run on a Beowulf cluster, which, as previously described, is onboard the BBD 10 and contains six 2.4 GHz Pentium IV computers running the Linux operating system. During each simulation of the simulated nervous system 12, sensory input is processed, the states of all neuronal units computed, the connection strengths of all plastic connections determined and motor output generated. Execution of each simulation cycle requires approximately 40 milliseconds of real time, which is limited by the cluster's computing power of this particular embodiment. Shorter cycle times may be preferable, but a 40 millisecond cycle time is sufficiently close to the 30 Hz frame rate of the camera shown generally at 16. During each simulation cycle, all neuronal activities of the simulated nervous system 12 and the status of the BBD may be saved on a hard disk of a disk drive (not shown) on the BBD 10. Reference may be made to U.S. Patent Publication No. 2005/0261803 A1, published Nov. 24, 2005, assigned to the assignee of the present invention and with common inventors, and incorporated herein by reference, for more details concerning brain-based devices having multi-processor computer architectures such as a Beowulf cluster that can be used to implement the present invention.

Table S1. This Table S1 shows values of parameters defining properties of neuronal units in the simulated nervous system 12 of FIG. 2. Areas Red, Ver, Hor, DirUp, DirDown, DirLeft, and DirRight are input areas and their activity is based on the image from the camera shown generally at 16 of FIG. 1A. IO-Turn and IO-Velo are input areas and their activity is based on the IR proximity detectors shown generally at 16. The Table S1 indicates the number of neuronal units in each area or sub-area (Size). Neuronal units in each area have a specific firing threshold ($\sigma$-fire), a threshold above which voltage-dependent connections can have an effect ($\sigma$-vdep), and a persistence parameter ($\omega$).

TABLE S1

Values of Parameters Defining Properties of Neuronal Units in the Simulated Nervous System

| neural area | Size | $\sigma$-fire | $\sigma$-vdep | $\omega$ |
|---|---|---|---|---|
| Red | 60 × 80 | 0 | 0 | 0 |
| V-Red | 30 × 40 | 0.05 | 0.1 | 0.25 |
| Streak | 30 × 40 | 0.05 | 0.1 | 0.99 |
| Ver | 30 × 40 | 0 | 0 | 0 |
| Hor | 30 × 40 | 0 | 0 | 0 |
| V1-H | 30 × 40 | 0.1 | 0.1 | 0.5 |
| V1-V | 30 × 40 | 0.1 | 0.1 | 0.5 |
| DirUp | 30 × 40 | 0 | 0 | 0 |
| DirDown | 30 × 40 | 0 | 0 | 0 |
| DirLft | 30 × 40 | 0 | 0 | 0 |
| DirRgt | 30 × 40 | 0 | 0 | 0 |
| V1-Up | 30 × 40 | 0.05 | 0.1 | 0.25 |
| V1-Dwn | 30 × 40 | 0.05 | 0.1 | 0.25 |
| V1-Lft | 30 × 40 | 0.05 | 0.1 | 0.25 |
| V1-Rgt | 30 × 40 | 0.05 | 0.1 | 0.25 |
| MT-Up | 30 × 40 | 0.05 | 0.1 | 0.25 |
| MT-Dwn | 30 × 40 | 0.05 | 0.1 | 0.25 |
| MT-Lft | 30 × 40 | 0.05 | 0.1 | 0.25 |
| MT-Rgt | 30 × 40 | 0.05 | 0.1 | 0.25 |
| PN | 30 × 40 | 0.1 | 0.1 | 0.25 |
| IO-Turn | 1 × 11 | 0 | 0 | 0 |
| PC-Turn | 1 × 11 | 0.1 | 0.1 | 0.25 |
| DCN-Turn | 1 × 11 | 0.1 | 0.1 | 0.25 |
| IO-Velo | 1 × 11 | 0 | 0 | 0 |
| PC-Velo | 1 × 11 | 0.1 | 0.1 | 0.25 |
| DCN-Velo | 1 × 11 | 0.1 | 0.1 | 0.25 |
| Motor-Turn | 1 × 11 | 0.1 | 0.1 | 0.25 |
| Motor-Velo | 1 × 11 | 0.1 | 0.1 | 0.25 |

Table S2. This Table S2 shows the properties of anatomical projections and connection types in the simulated nervous system 12. A presynaptic neuronal unit connects to a postsynaptic neuronal unit with a given probability (p) and given projection shape (Arbor). This arborization shape can be rectangular "block [h,w]" with a height and width, non-topographical "nontopo" where any pairs of presynaptic and postsynaptic neuronal units have a given probability of being connected, or "coincidence" where there is a one to one projection from the pre-synaptic receptive field to the post-synaptic receptive field and these connections only have an effect on the post-synaptic unit if all the connected pre-synaptic units are active above the firing threshold. The initial connection strengths, $c_{ij}(0)$, are set randomly with a uniform distribution within the range given by a minimum and maximum value [min, max]. A negative value for $c_{ij}(0)$ indicates inhibitory connections. A connection type can be voltage-independent (VI), or voltage-dependent (VD). Non-zero values for the learning rate $\eta$ signify plastic connections where positive values of $\eta$ indicates synaptic potentiation and negative values of $\eta$ indicates synaptic depression.

TABLE S2

Properties of Anatomical Projections and Connection Types in the Simulated Nervous System

| Projection | Arbor | p | $c_{ij}(0)$ | type | $\eta$ |
|---|---|---|---|---|---|
| Red→V-Red | block [1, 1] | 1.0 | [0.05, 0.06] | VI | 0 |
| V-Red→Streak | block [1, 1] | 1.0 | [0.20, 0.25] | VI | 0 |
| Streak→V-Red | block [4, 4] | 1.0 | [0.8, 0.9] | VD | 0 |
| Streak→Streak | block [4, 4] | 1.0 | [0.15, 0.20] | VD | 0 |
| DirUp→Up | block [1, 1] | 1.0 | 0.8 | VI | 0 |
| DirDown→Down | block [1, 1] | 1.0 | 0.8 | VI | 0 |
| DirLft→Lft | block [1, 1] | 1.0 | 0.8 | VI | 0 |
| DirRgt Rgt | block [1, 1] | 1.0 | 0.8 | VI | 0 |
| Up→Down | block [2, 2] | 1.0 | −1.0 | VI | 0 |

TABLE S2-continued

Properties of Anatomical Projections and Connection Types in the Simulated Nervous System

| Projection | Arbor | p | $c_{ij}(0)$ | type | η |
|---|---|---|---|---|---|
| Down→Up | block [2, 2] | 1.0 | −1.0 | VI | 0 |
| Lft→Rgt | block [2, 2] | 1.0 | −1.0 | VI | 0 |
| Rgt→Lft | block [2, 2] | 1.0 | −1.0 | VI | 0 |
| V-Red→Down | block [2, 2] | 1.0 | −0.8 | VI | 0 |
| V-Red→Up | block [2, 2] | 1.0 | −0.8 | VI | 0 |
| V-Red→Rgt | block [2, 2] | 1.0 | −0.8 | VI | 0 |
| V-Red→Lft | block [2, 2] | 1.0 | −0.8 | VI | 0 |
| Hor→V-H | block [1, 1] | 1.0 | 0.8 | VI | 0 |
| Ver→V-V | block [1, 1] | 1.0 | 0.8 | VI | 0 |
| V-V→V-H | block [2, 2] | 1.0 | −1.0 | VI | 0 |
| V-H→V-V | block [2, 2] | 1.0 | −1.0 | VI | 0 |
| V-V→MT-Up | Coincidence | 1.0 | [0.4, 0.5] | VI | 0 |
| Up→MT-Up | Coincidence | 1.0 | [0.4, 0.5] | VI | 0 |
| V-V→MT-Down | Coincidence | 1.0 | [0.4, 0.5] | VI | 0 |
| Down→MT-Down | Coincidence | 1.0 | [0.4, 0.5] | VI | 0 |
| V-H→MT-Lft | Coincidence | 1.0 | [0.4, 0.5] | VI | 0 |
| Lft→MT-Lft | Coincidence | 1.0 | [0.4, 0.5] | VI | 0 |
| V-H→MT-Rgt | Coincidence | 1.0 | [0.4, 0.5] | VI | 0 |
| Rgt→MT-Rgt | Coincidence | 1.0 | [0.4, 0.5] | VI | 0 |
| MT-Up→PN | block [1, 1] | 0.5 | [0.70, 0.75] | VI | 0 |
| MT-Down→PN | block [1, 1] | 0.5 | [0.70, 0.75] | VI | 0 |
| MT-Lft→PN | block [1, 1] | 0.5 | [0.70, 0.75] | VI | 0 |
| MT-Rgt→PN | block [1, 1] | 0.5 | [0.70, 0.75] | VI | 0 |
| PC-Turn→DCN-Turn | block [1, 1] | 1.0 | −1.5 | VI | 0 |
| IO-Turn→Motor-Turn | block [2, 2] | 1.0 | 0.6 | VI | 0 |
| IO-Turn→PC-Turn | block [1, 1] | 1.0 | 0.2 | VI | 0 |
| IO-Turn→DCN-Turn | block [1, 1] | 1.0 | 0.5 | VI | 0 |
| DCN-Turn→Motor-Horz | block [2, 2] | 1.0 | 0.4 | VI | 0 |
| PC-Velo→DCN-Velo | block [1, 1] | 1.0 | −1.5 | VI | 0 |
| IO-Velo→Bod-Velo | block [2, 2] | 1.0 | 0.6 | VI | 0 |
| IO-Velo→PC-Velo | block [1, 1] | 1.0 | 0.2 | VI | 0 |
| IO-Velo→DCN-Velo | block [1, 1] | 1.0 | 0.5 | VI | 0 |
| DCN-Velo→Motor-Velo | block [1, 1] | 1.0 | 0.4 | VI | 0 |
| PN→DCN-Turn | Nontopo | 1.0 | 0.5 | VI | 0.04 |
| PN→PC-Turn | Nontopo | 1.0 | 0.5 | VI | −0.08 |
| PN→DCN-Velo | Nontopo | 1.0 | 0.5 | VI | 0.04 |
| PN→PC-Velo | Nontopo | 1.0 | 0.5 | VI | −0.08 |

Neuronal Dynamics and Synaptic Plasticity. Neuronal units in the simulated nervous system 12 of the brain-based device (BBD) 10 are simulated by a mean firing rate model, and synaptic connections between neuronal units, both within and between neural areas, are set to be either voltage-independent or voltage-dependent, and either plastic or non-plastic. Voltage-independent connections provide synaptic input regardless of postsynaptic state. Voltage-dependent connections represent the contribution of receptor types (e.g. NMDA receptors) that require postsynaptic depolarization to be activated and tend to play a modulatory role in neuronal dynamics.

The mean firing rate of each neuronal unit ranges continuously from 0 (quiescent) to 1 (maximal firing). The state of a neuronal unit is updated as a function of its current state and contributions from voltage-independent and voltage-dependent inputs, as described in Krichmar, J. L. and Edelman, G. M. (2002) *Cereb Cortex*, 818-30; and Seth, A. K., McKinstry, J. L., Edelman, G. M. and Krichmar, J. L. (2004) *Cereb Cortex*, 1185-99.

The voltage-independent input from unit j to unit i is:

$$A_{ij}^{VI}(t) = c_{ij}s_j(t), \quad (6)$$

where $s_j(t)$ is the activity of unit j, and $c_{ij}$ is the connection strength from unit j to unit i. The voltage-independent postsynaptic influence, $POST_i^{VI}$, on unit i is calculated by summing over all the inputs onto unit i:

$$POST_i^{VI}(t) = \sum_{j=1}^{N} (A_{ij}^{VI}(t)); \quad (7)$$

where N is the number of connections, which can be from different anatomically defined connection types (see Table S2), projecting to unit i. The voltage-dependent input from unit j to unit i is:

$$A_{ij}^{VD}(t) = \Phi(POST_i^{VI}(t))c_{ij}s_j(t), \text{ where } \Phi(x) = \begin{cases} 0; & x < \sigma_i^{vdep} \\ x; & \text{otherwise;} \end{cases} \quad (8)$$

where $\sigma_i^{vdep}$ is a threshold for the postsynaptic activity below which voltage-dependent connections have no effect (see Table S1).

The voltage-dependent postsynaptic influence on unit i, $POST_i^{VD}$, is given by:

$$POST_i^{VD}(t) = \sum_{j=1}^{N} (A_{ij}^{VD}(t))$$

The total post-synaptic influence on neuronal unit i is given by:

$$POST_i = POST_i^{VI} + POST_i^{VD};$$

The new activity is determined by the following activation function:

$$s_i(t+1) = \phi(\tanh(POST_i + \omega s_i(t))), \text{ where } \phi(x) = \begin{cases} 0; & x < \sigma_i^{fire} \\ x; & \text{otherwise;} \end{cases}$$

where ω determines the persistence of unit activity from one cycle to the next, $g_i$ is a scaling factor, and $\sigma_i^{fire}$ is a unit specific firing threshold. Specific parameter values for neuronal units are given in Table S1, and synaptic connections are specified in Table S2.

Delayed Eligibility Trace Learning Rule. Synaptic strengths are subject to modification according to a synaptic rule that depends on the pre-, post-synaptic, and inferior olive IO activities. The specific parameter settings for fine-scale synaptic connections are given in the equations below and Table S2.

Synaptic changes in $c_{ij}$ are given by:

$$\Delta c_{ij}(t+1) = \eta s_i(t) * \text{trace}_{eligibility}(t) * (IO_i(t) - 0.02);$$

where $s_i(t)$ is the activity of the post-synaptic unit, $\text{trace}_j(t)$ is the eligibility trace of synapse j, $IO_i(t)$ is the activity of the inferior olive IO unit corresponding to unit i, and η is a fixed learning rate. The learning rule supports both potentiation and depression at the parallel fiber-Purkinje cell (PC) synapses. The mechanism induces depression when the inferior olive IO is active above a baseline firing rate, and potentiation when the inferior olive IO is below the baseline firing rate. The learning rule supports extinction of learned responses when the error from the inferior olive IO is absent.

The plasticity of a synapse is based on the delayed eligibility trace rule of the present invention, described above, where an eligibility trace ($trace_{eligibility}$) determines the amount of synaptic change at that synapse when eligible:

$$trace_{eligibility}(t+1) = \begin{cases} 0 \text{ if } s(t-\Delta) < \sigma \text{ for all } \Delta < \text{delay,} \\ s(t-\text{delay}) \text{ if } s(t-\text{delay}) \geq \sigma, \\ 0.90 * trace_{eligibility}(t) \text{ otherwise} \end{cases}$$

where s(t) is the presynaptic input to the synapse, and σ=0.15, Δ is a time offset from the previous simulation cycle. This means that when the presynaptic input exceeds a threshold, the synapse becomes eligible for modification after a set delay, at which time, the eligibility declines exponentially. The delay, as described below, was varied to investigate the effect of different delay periods. The delay periods investigated were 0, 2, 4, and 8 seconds.

The delayed eligibility trace learning rule works as follows (assuming a 4 second delay):

Before the Learning Stage of the BBD 10
1. At time 0, visual input (Visual Input and cortical area MT) activates PN→DCN and PN→PC synapses above the threshold.
   a. These above threshold synapses are put in a delay buffer of the on-board computer cluster.
   b. DCN activity is not strong enough to evoke a motor response.
2. 4 seconds later the BBD 10 hits an obstacle
   a. The synapses that have been put in the delay buffer for 4 or more seconds are now eligible for synaptic change.
   b. An error signal from the inferior olive IO occurs.
   c. Eligible PN→DCN and PN→PC synapses change due to IO activity.
   d. The IO→DCN connections are strong enough to evoke a motor response away from the obstacle.

After the Learning Stage and During the Testing Stage
1. At time 0, visual input activates PN→DCN and PN→PC synapses above the threshold.
   a. These above threshold synapses are put in the delay buffer.
   b. Because of previous synaptic change, DCN activity now evokes a motor response.
   c. The BBD 10 turns away from the obstacle well before a collision takes place.
2. 4 seconds later the BBD 10 has not hit any obstacles
   a. The error signal from IO does not occur.
   b. No further synaptic change takes place.

Sensory Input

Vision and Motion Processing. In one embodiment, visual information is provided to the BBD 10 by a Sony IEEE 1394 CCD camera shown generally at 16 that captures 640×480 pixel images at 30 frames per second. The raw sensory pixel data is separated into luminance and color channels (YUV colorspace). The luminance information feeds into a set of color detectors for Red, Green, Blue, Yellow, Pink and Purple. To speed up the color-based object recognition, the colors are recognized by using a lookup table of the computer cluster for each color on the UV color space. A value in the color table may be regarded as the probability of a particular UV coordinate belonging to that specific color. In the training and testing stages of the present invention, only the red color detector is used and it is tuned to the color of the cones marking the motor task course shown in FIGS. 1A, 1B. The red color detectors are fed into the neural simulation (Red in Tables S1 and S2).

As previously mentioned, visual streaks or blur can provide motion information. Motion streak is achieved by a combination of neuronal persistence and reciprocal connections between the Red and the Streak neural areas (see Tables S1 and S2). Horizontal and vertical edges are determined by convolving the Streak neural area having filters, e.g., 8×8 Gabor filters, with horizontal and vertical orientations. The results of the convolution are directly input into the neural groups Hor and Ver. Direction selective responses for up, down, left, and right are determined by a cross-correlation of the previous and current Streak neural activities. The results of the cross-correlations are directly input into neural areas DirUp, DirDown, DirLeft, and DirRight of simulated nervous system 12 shown in FIG. 2.

$$d_{ij}(x, y) = 0.25 * \sum_{s=5}^{8} \text{Streak}(t-1, x+s*i, y+s*j) * \text{Streak}(t, x, y);$$

where $d_{ij}(x,y)$ is the activation of the direction selective neuronal unit (x,y), i was set to −1 for left and +1 for right, j was set to −1 for down and +1 for up. Streak(t,x,y) is the Streak neuronal unit (x,y) at time t, and s is the speed or pixel offset.

Activation of a neuronal unit in simulated cortical area MT 24 is a result of coincident activity of an orientation-selective neuronal unit with a direction-selective neuronal unit. For example, an MT-Down neuronal unit (See FIG. 2) at a given receptive field is active when a vertical orientation neuronal unit (i.e. V-V) and a downward motion selective unit (i.e. Down) are co-active at the same receptive field (see Table S2). Such a combination unambiguously encodes motion.

Figure 7A:
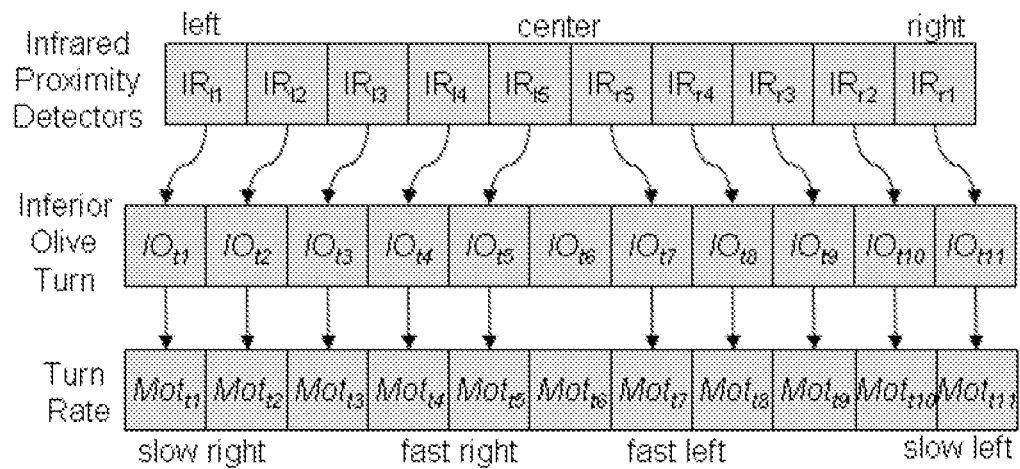
FIG. 7A illustrates turn mappings from the infrared (IR) proximity detectors (IP-Turn) of the brain-based device of FIG. 1A to the inferior olive (IO) for turn error (IO-Turn) which map onto the motor area for turn commands (Motor-Turn) shown in the neuroanatomy of FIG. 2.
Figure 7B:
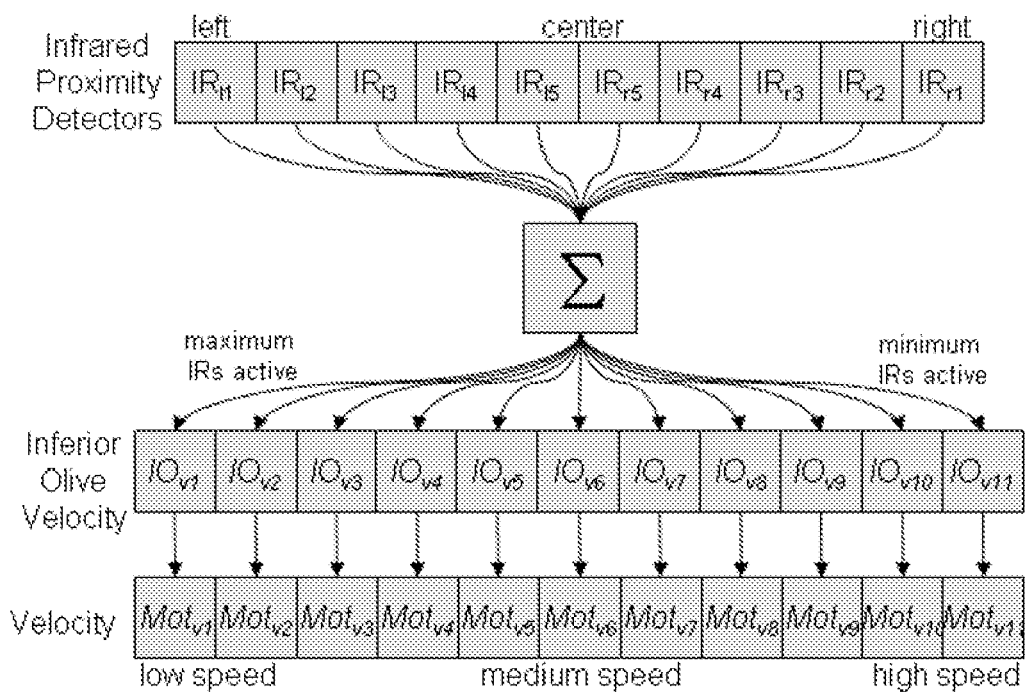
FIG. 7B illustrates velocity mapping from the infrared (IR) proximity detectors (IR-Velo) of the brain-based device of FIG. 1A via a summation Σ to the inferior olive (IO) for velocity (IO-Velo) which map onto the motor area for velocity commands (Motor-Velo) shown in the neuroanatomy of FIG. 2.

Motor Error Signal. FIGS. 7A-7B show mappings from IR proximity detectors shown generally at 16 to the inferior olive IO error signal and the motor system of the BBD 10. The IR proximity detectors or sensor array shown generally at 16 is arranged as a row of 11 sensors across the front of the BBD 10. As shown in FIG. 7A, the mapping is from the IR sensors to the turn commands. IR signals map directly to the inferior olive IO signal for turn errors (IO-Turn), which map onto the motor area for turn commands (Motor-Turn). IR signals toward the center of the BBD 10 signal a near head-on collision and result in a hard turn away from the obstacle, whereas IR signals pointing laterally on the BBD 10 result in a more gentle turn away from the obstacle. Not shown in FIG. 7A are projections from the deep cerebellar nuclei DCN to the motor area (DCN→Motor-Turn) (which are indicated in FIG. 2).

In FIG. 7B the mapping is from the IR proximity detectors or sensors 16 to the velocity signals. Speed of the BBD 10 is controlled by a function of the number and magnitude of above threshold IR detectors 16; that is, the BBD 10 is commanded to move slower when more IR detectors 16 signal a nearby obstacle. Σ refers to the summation of all the IR values. The speed function results in the setting of activities in the inferior olive IO for velocity error (IO-Velo), which map onto the motor area for speed control (Motor-Velo). Not shown in FIG. 7B are projections from the deep cerebellar nuclei DCN to the motor area (DCN→Motor-Veto) (which are indicated in FIG. 2).

In the present visuomotor training and testing stages, motor error is signaled by the infrared (IR) proximity detectors shown generally at 16 when the BBD 10 is within a foot of an obstacle. The IR detectors 16 give a normalized signal from 0.0 to 1.0, where 0.0 signifies no object within the IR range, and 1.0 signifies an object within an inch of the IR detector 16. The IR detector threshold is set to 0.5, which corresponds to approximately 12 inches. The IR signal from 0.5 to 1.0 is roughly linear.

The inferior olive IO region transmits motor error information to the simulated cerebellum 26. The IR detectors shown generally at 16 are converted into inferior olive IO activations for turn errors (IO-Turn in FIG. 7A) and velocity errors (see IO-Velo in FIG. 7B) causing the BBD 10 to turn away from obstacles and slow down in the presence of obstacles. The IO-Turn area is set based on the value of the corresponding IR proximity detectors 16 (see FIG. 7A). The IO-Velo area is set based on the number of active IR detectors 16 above threshold (see FIG. 7B):

$$IOVelo(i) = IR_{max}(1 - (IR_{num} - i)^4);$$

Where $IR_{max}$ is the largest value among all the IR detectors 16, i is the index ranging from 1 to 11, and $IR_{num}$ is the number of IR detectors above threshold (see FIG. 7).

Motor Output. Motion of the BBD 10 is controlled by velocity (meters/sec) and turn rate (degrees/sec) commands. At a given turn rate, the radius of the turn is a function of velocity; i.e. a turn rate with zero velocity results in the BBD 10 turning in place and the same turn rate at a high velocity results in a wide turn.

Motor output to the wheels of the BBD 10 shown in FIG. 1A is derived from the activities of the neural motor areas (see Motor-Turn and Motor-Velo in Tables S1 and S2). The turn rate of the BBD 10 is set based on the Motor-Turn activity (see FIG. 7A). The centroid of the Motor-Turn activity is calculated and used to control the turning of the BBD 10. Activity corresponding to slightly left of center of the device (e.g. $Mot_{r5}$ in FIG. 7A) results in the highest rightward turn rate (1.3 deg/sec) and activity corresponding to the lateral left side of the device (e.g. $Mot_{r1}$ in FIG. 7A) results in the lowest rightward turn rate (0.26 deg/sec). Leftward turns are calculated in the same manner. Moto-Turn activity is affected by IR input via the inferior olive (see IO-Turn→Motor-Turn in Table S2) and by visual input via the cerebellum (see DCN-Turn→Motor-Turn in Table S2).

The speed of the BBD 10 is controlled based on the activity of the Motor-Velo area (see FIG. 7B). Activity Motor-Velo in the area causes a deceleration of the speed of BBD 10. When there is no motor activity, the speed is set to a maximum of 1.25 meters/sec. The Motor-Velo area slows down the BBD 10 based on the number of IR detectors (shown generally at 16) signaling an obstacle; that is, the more detectors that are activated, the slower the velocity. Moto-Velo activity is affected by IR input via the inferior olive (see IO-Velo→Motor-Velo in Table S2) and by visual input via the cerebellum (see DCN-Velo→Motor-Velo in Table S2).

FIGS. 8A-8C and FIGS. 8D-8F illustrate the distributions of speeds and turn rates for the BBD 10. The left column shows histograms of the velocity motor commands for the gradual, middle, and sharp turn courses shown in FIG. 1B. The right column shows histograms of the turn commands for the gradual, middle, and sharp turn courses of FIG. 1B. Frequency refers to the number of simulation cycles at a given speed (left column) and turn rate (right column).

FIGS. 9A and 9B illustrate the adapting by the BBD 10 from one course to another of FIG. 1B. The plots show the mean motor error for five subjects in each condition and the error bars denote the standard deviation. FIG. 9A illustrates subjects from the gradual group (gradual) being compared to subjects that trained on the sharp course and adapted to the gradual course (sharp2grad) of FIG. 1B. The sharp2grad group has significantly lower motor error on the first 6 laps than the gradual group (p<0.005 one-tailed t-test). FIG. 9B illustrates subjects from the sharp group (sharp) being compared to subjects that trained on the gradual course and adapted to the sharp course (grad2sharp) of FIG. 1B. The grad2sharp group has significantly lower motor error on the first 6 laps than the sharp group (p<0.005 one-tailed t-test).

Figure 10A:
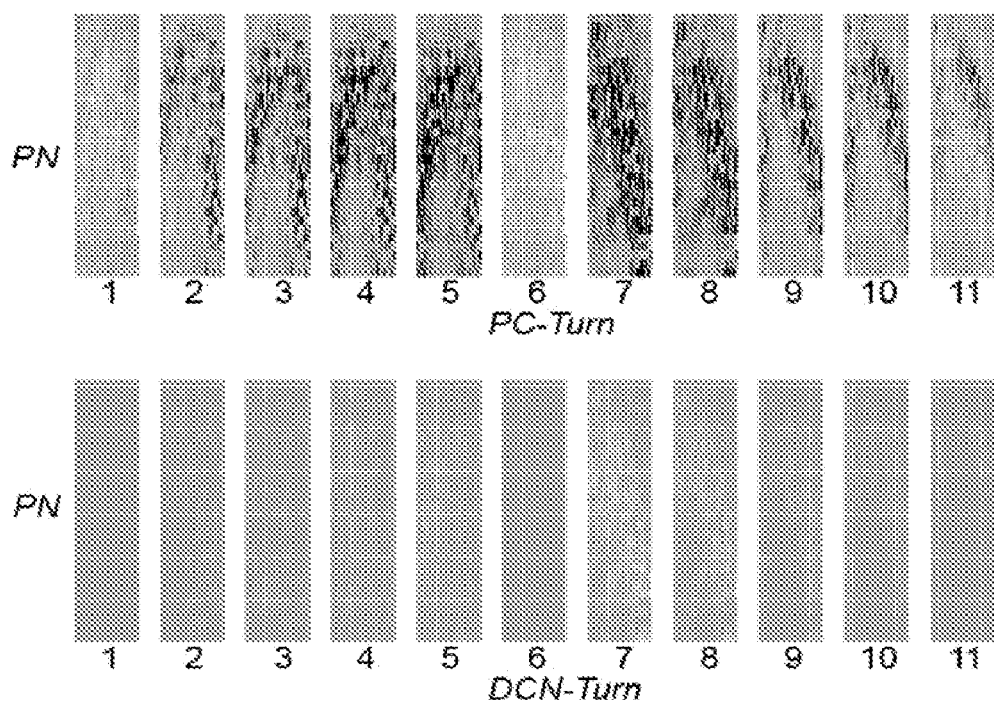
FIG. 10A illustrates weights from the precerebellar nuclei (PN) to the Purkinje cells (PC) and the deep cerebellar nuclei (DCN) involved in turning control of the brain-based device of FIG. 1A.
Figure 10B:
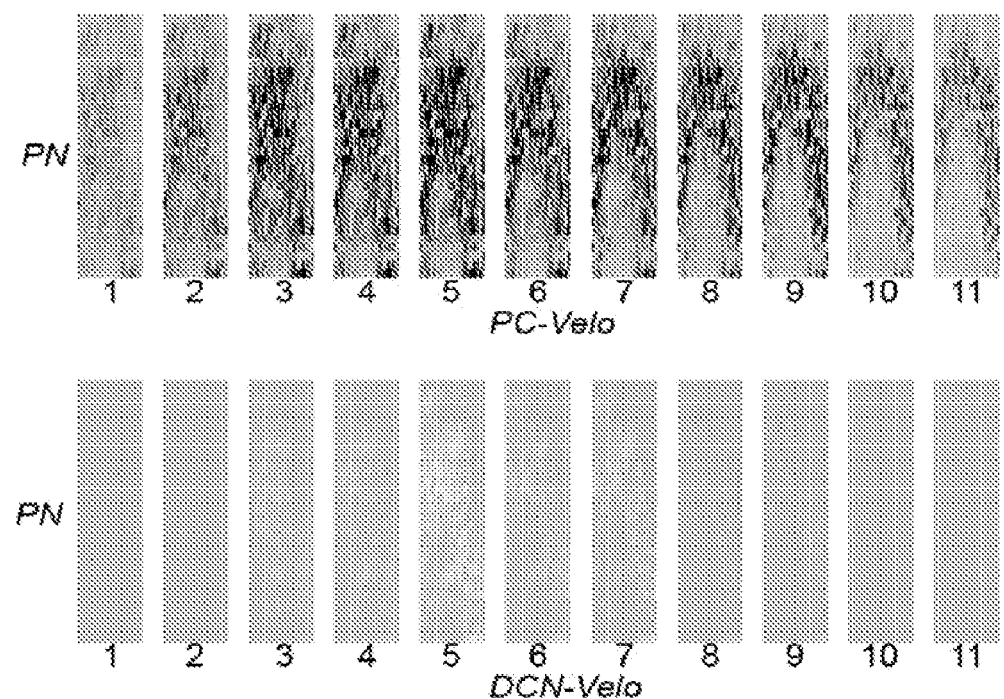
FIG. 10B illustrates weights from the precerebellar nuclei (PN) to the Purkinje cells (PC) and the deep cerebellar nuclei (DCN) involved in velocity control of the brain-based device of FIG. 1A.

FIGS. 10A and 10B indicate weights from the precerebellar nuclei (PN) to the Purkinje cells (PC) and the deep cerebellar nuclei (DCN). Each pixel indicates the value of the weight from a cell in PN to a cell in PC or DCN. Since in this embodiment there are 30×40 PN neuronal units (See Table S1), and 11 cells in PC-Turn and DCN-Turn, there are 11 matrices in each row, one 30×40 mapping to each PC or DCN neuronal unit. The grey level indicates the strength where the maximum is white and the minimum is black. All weights are initialized to 0.5 (medium gray). Therefore, darker pixels indicate weights that have undergone depression and lighter pixels indicate weights that have undergone potentiation. In FIG. 10A the weights from PN to the PC-Turn and DCN-Turn are involved in turning control. The weights are for one BBD 10 subject after training in the middle course of FIG. 1B. Minimum weight value is 0.00 and the maximum weight value is 0.78. In FIG. 10B the weights from PN to PC-Velo and DCN-Velo are involved in velocity control. The weights are for one BBD 10 subject after training in the middle course of FIG. 1B. The minimum weight value is 0.00 and the maximum weight value is 0.70.

FIGS. 11A and 11B illustrate responses from selected neural areas on the gradual course shown in FIG. 1B during a single pass before and after training. These figures illustrate how the simulated cerebellum works, and how changes in neural activity correlate with improved performance. FIG. 11A shows the first training pass for a representative "subject." Activity shows the responses during reflexive actions that are activated by collisions or near collisions by the BBD 10 with the cones shown in FIG. 1A. In FIG. 11A(a), the position of the BBD 10, shown in green, relative to the track boundary, shown in orange, is shown for each simulation cycle. Illustrations (b)-(i) indicate the dynamic activity, shown in gray level, of each neuronal unit in various neural areas over time. White indicates maximal activity and black indicates no activity. (b)-(e) show activity in the cerebellar circuit controlling turning. (b). Turning related Inferior Olive activity is driven by the IR detectors shown generally at 16 indicating the range of the cones in various directions in the front of the BBD 10 of FIG. 1A. The detailed mapping is given in FIG. 7A. (c). Turning related Purkinje cell (PC-Turn) activity influences turning by topographic inhibitory connections to DCN-Turn. (d). Turning related Deep Cerebellar Nucleus (DCN-Turn) activity controls turning via topographic, excitatory projections to the Motor Turn area. (e). Turning related motor area activity (Motor Turn). Neuronal units 1-5 increase the left wheel speed of the BBD 10 causing a turn to the right, while units 7-11 increase the speed of the right wheel causing a turn to the left. The detailed mapping is given in FIG. 7A. (f)-(i) show activity in the cerebellar circuit controlling velocity. (f) The detailed mapping from IR input to IO-Velo activation is given in FIG. 7B. (g) Velocity related Purkinje cell (PC-Turn) activity influences velocity by topographic inhibitory connections to DCN-Velo. (h) Velocity related Deep Cerebellar Nucleus (DCN-Velo) activity controls velocity via topographic, excitatory projections to the Motor Velo area. (i). Velocity command motor area activity (Motor Velo). The braking signal is a population response with stronger total IR activity activating higher numbered neurons and resulting in increased deceleration.

FIG. 11B illustrates the dynamic neural responses from selected neural areas on the same course shown in FIG. 11A at the end of training. FIGS. 11B(a)-(i) are as in FIG. 11A. There are several differences to note. First, after training, the BBD 10 travels close to the center of the path (compare FIGS. 11A(a) and 11B(a)), and there is less error related activity in the Inferior Olive (FIGS. 11A(b) vs 11B(b) and 11A(f) vs 11B(f)). Second, unlike in FIGS. 11A(d) and (h), FIGS. 11B(d) and 11B(h) show motor output from the DCN areas which preceded and occurred in the absence of error related IO activity. Finally, certain PC neuronal units, after learning, were not active (FIG. 11A(c) vs FIG. 11B(c) and FIG. 11A(g) vs FIG. 11B(g)), disinhibiting corresponding DCN neuronal units for turning (FIG. 11A(d) vs FIG. 11B(d)) and braking (FIG. 11A(h) vs FIG. 11B(h), resulting in smooth movements down the center of the path.

SUMMARY OF RESULTS

Motor learning is assessed on various "S"-curved courses marked by a set of orange traffic cones, as shown in FIGS. 1A, 1B. The platform for this task is a Segway Robotic Mobility Platform (RMP) modified to have as inputs a camera, a laser range finder, and infrared proximity detectors, all shown generally at 16. The simulated nervous system 12 of BBD 10 contains 28 neural areas, 27,688 neuronal units, and approximately 1.6 million synaptic connections, as indicated in Table S1. Using an embedded Beowulf computer cluster, it takes about 40 ms of real-time to update all the neuronal units and plastic connections in the model each simulation cycle.

The performance of the BBD 10 is tested on three different courses (FIG. 1B): a sharp set of turns ("sharp"), a moderate set of turns ("middle"), and a gentle set of turns ("gradual"). The BBD 10 traverses each course until it reached the end; it then turns around and traverses the course in the opposite direction. Each traversal is referred to in this specification as a lap. Training of the BBD 10 included 20 laps followed by 4 laps of testing, during which the IR driven reflex is inactivated and only visual cues are available to the BBD 10.

The inferior olive (IO) is believed to transmit motor error information to the cerebellum. In the present visuomotor task, motor error is signaled by infrared (IR) proximity detectors 16 when the BBD 10 is within a foot of an obstacle. IR detector responses are converted into inferior olive IO activations for turn errors (IO-Turn in FIG. 2) and velocity errors (IO-Velo in FIG. 2), and cause the BBD 10 to reflexively turn away from obstacles and slow down in the presence of obstacles. After learning, visual motion cues alone are sufficient to drive smooth movement of the BBD 10 down the center of the curved course (MT→DCN→Motor in FIG. 2).

Learning is measured by the magnitude of a motor error, reflecting the average per lap IR responses to obstacles, where IR values range from 0 (i.e. no object within IR range) to 1 (i.e. an object within an inch of the IR detectors 16). Training and testing is repeated with five different "subjects". Each subject is the same physical BBD 10, but each possesses a unique simulated nervous system. This variability among subjects is a consequence of random initialization in the probability distributions of connections between individual neuronal units and the initial connection strengths between those units (see Table S2). The overall pattern of connectivity among neural areas remains similar, however, amongst the different subjects. Each simulation cycle, the motor error, the BBD 10 turn rate and speed, and the state of all neuronal units may be recorded for analysis.

The effect of the trace delay (described above) on the ability to navigate a path designated by orange cones shown in FIG. 1A may be tested by varying the delay interval. Delay intervals of 0, 2, 4, and 8 seconds are tested on the middle course (FIG. 1B) at a constant speed (60% of maximum speed or 0.75 m/s). During these tests, the neural pathways controlling speed are made absent. As a control, there is a "no learning" group in which the DCN→Motor connections are lesioned and behavior is driven by only the IR reflex.

The delayed eligibility trace learning rule is most effective at delays of two and four seconds in this task (FIG. 3A). After approximately five laps, the subjects of the BBD 10 with rules having two and four second delays transitioned from awkward movements and cone collisions to smooth movement down the center of the path. After training, connections from the IO are lesioned and the simulated nervous system is tested with only visual cues (FIG. 3B). The motor error, as seen in FIG. 3B, is significantly lower with moderate delays (2 or 4 seconds) than with long delays (8 seconds), no delays, or with no learning.

Figure 4A:
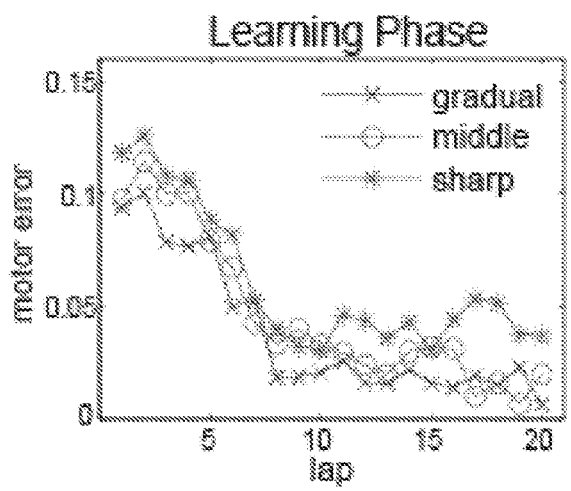
FIG. 4A illustrates, graphically, the learning phases of the brain-based device of FIG. 1A while on the gradual, middle and sharp curved courses, respectively, of FIG. 1B.
Figure 4B:
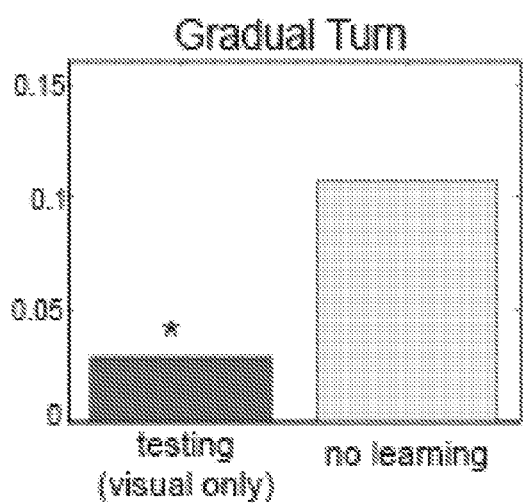
FIGS. 4B-D illustrate graphically a comparison of the brain-based device having been through a learning phase vs. having not been through a learning phase for a testing phase over the respective gradual, middle and sharp curved courses.
Figure 4C:
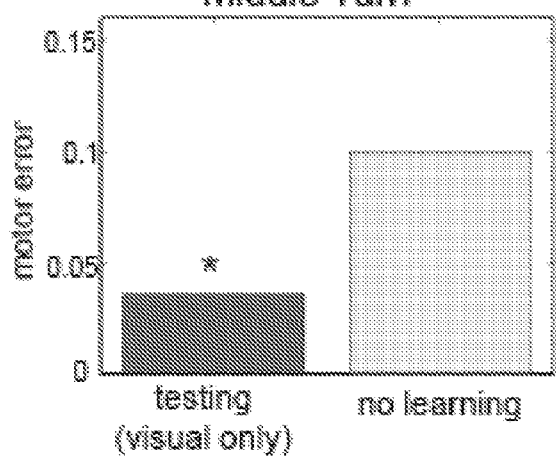
Figure 4D:
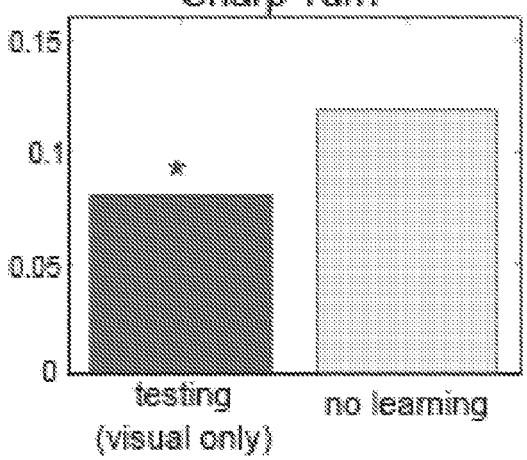

Successful performance across the three courses, sharp, middle and gradual, with varying turns requires a combination of braking and turning of the proper magnitude at the proper time. The 4 second delay incorporated into the delayed eligibility trace learning rule is sufficient for successful navigation on all three courses (see FIG. 4). Subjects learn to slow down prior to and during turns, and they learn to turn in the proper direction at the proper time. Subjects on the sharp course, which contain roughly 90 degree turns, had slightly worse performance than on the other courses. Nevertheless, in the testing phase, subjects with cerebellar learning perform significantly better on all three courses than do subjects without learning (FIG. 4B-D).

Subjects adapt their behaviors to the particulars of each course (see FIG. 8). For example, subjects are faster on the gradual course than on the sharp course. Success on the sharp course requires slower speed and more frequent turning to the left or the right. Subjects on the gradual course typically proceed at maximum velocity on the straightaways, and simultaneously slow and turn slightly on the curves. Learning on one course generalized to others. For example subjects trained on the sharp course are retrained on the gradual course (see FIG. 9A), and subjects trained on the gradual course were retrained on the sharp course (see FIG. 9B). In both cases, trained subjects showed significantly better performance on the early training laps (e.g. laps 1-6) than naïve subjects ($p < 0.005$ one-tailed t-test). Adapting from the gradual to the sharp course, however, may require additional training to reach peak performance.

The synthetic neural modeling approach employing a BBD 10 allows simultaneous recording of the state and interactions of all components of the simulated nervous system 12 at all levels during performance of a behavioral task in the real world similar to that described in the above-referenced published patent application. To understand the cues are triggering the BBD's motor commands, responses from the neuronal units and synaptic weight changes throughout the BBD's training and testing may be analyzed. It is of particular interest to trace activity from the motor output units back to the simulated cortical areas for visual motion.

The simulated nervous system 12 initiates the appropriate motor responses based on motion cues. A known method, called a backtrace procedure, identifies functional pathways by choosing a particular reference neuronal unit at a specific time and recursively examining the previous activities of all neuronal units that caused the observed activity in this reference unit; see Krichmar, J. L., Nitz, D. A., Gally, J. A. & Edelman, G. M. (2005) *Proc Natl Acad Sci USA* 102, 2111-6.

As an example, four 40 ms time steps are traced back, beginning with reference neuronal units in the motor areas (Motor-Turn and Motor-Velo) that caused decelerations, left turns, and right turns to be specified by the motion selective neuronal units in cortical areas MT. These backtraces are carried out after learning has taken place, laps 11-20, in which laps there are low motor errors. Starting with a motor reference unit in Motor-Turn or Motor-Velo, the backtrace first identifies a list of other neuronal units that are physically connected to the reference unit and that are active during the previous time step. The procedure may then be repeated with this new list of neuronal units. This process was iterated until the cortical MT units that led to the motor reference event are identified. Using this method, backtrace networks are generated that comprised 377 turns to the left and 280 turns to the right. These backtraces represent a direct causal chain of neuronal units through the network from sensory perception to motor action (i.e. MT→PN→DCN→Motor in FIG. 2).

FIG. 5 shows a composite of the MT units that, after training, resulted in successful movements. The MT units selected for motor movements respond to a combination of directional tuning and positional information. For example, activity in the upper left receptive field of MT-Right cause turns to the right and the lower left receptive field of MT-Down also cause turns to the right.

Experience results in a shift in neuronal dynamics: Initially, IR detector input causes IO activity which drives the motor neurons. After learning, visual input causes DCN activity which then drives motor neurons prior to any error signal from IO (See FIG. 11). These changes are brought about by alterations in synaptic efficacy in which depression at the PC synapse cause disinhibition of DCN neuronal units resulting in DCN activity that drive motor activity. To a lesser degree, potentiation at the DCN synapses also increase the DCN response to visual cues (See FIG. 10).

The changes in synaptic weight due to experience-dependent plasticity changes based on the delayed eligibility trace learning rule of the present invention may also be examined. Depression at PC synapses is primarily responsible for velocity control (See FIG. 10B) and turning (See FIG. 10A). Motion cues indicating the proximity of a cone shown in FIG. 1A, whether on one side or the other of the visual field, triggers braking behavior. Moreover, when comparing synaptic weight changes in response to the different courses (sharp, middle, gradual), the number and strength of the connections are changed to a greater extent in the case of the sharp course as compared with the gradual course (FIG. 6) correlating with the BBD's overall lower speed on the sharp course (See FIG. 8). Weight changes responsible for the control of turning (See FIG. 10) show a pattern consistent with the MT responses shown in FIG. 5. Cerebellar potentiation and depression coupled with the proposed reflexive error signal from IO and the delayed eligibility trace learning rule are together sufficient to adjust the weights in accord with known synaptic learning rules in the cerebellum.

The foregoing description of the preferred embodiments of the present invention has been provided for purposes of illustration and description. It is not intended to be exhaustive or to limit the invention to the precise forms disclosed. Many modifications and variations will be apparent to the practitioner skilled in the art. Embodiments were chosen and described in order to best explain the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A method for controlling movement of a mobile brain-based device in a real-world environment, the brain-based device including a simulated nervous system modeling the cerebellum, the method comprising:

during a learning stage of the brain-based device (i) providing visual input to activate synapses from precerebellum nuclei (PN) to Purkinje cells (PC) and from precerebellum nuclei (PN) to deep cerebellar nuclei (DCN) above a threshold, (ii) storing those synapses which are above the threshold, (iii) after a certain time, generating an error signal in the event the mobile brain-based device hits an obstacle, (iv) providing the error signal from an inferior olive (IO) to the synapses of the PN to PC and PN to DCN paths, in which those synapses which have been stored for at least the certain time undergo synaptic change due to the error signal, and in which the synaptic connectors in the path IO to DCN are strong enough to evoke a response causing the mobile brain-based device to move away from the obstacle.

2. A method according to claim 1, further comprising:

during a testing stage, (i) providing visual input to activate synapses in the paths PN to PC and PN to DCN above a threshold, (ii) storing the above threshold synapses, wherein, as a result of the synaptic change during the learning stage, activity of the deep cerebellar nuclei (DCN) evokes a response to cause the brain-based device to avoid the obstacle, and (iii) wherein after a certain time no error signal is generated from the inferior olive (IO) and no further synaptic change occurs.

3. A method according to claim 2, wherein the certain time is predetermined, and is in the range of 2-4 seconds.

4. A brain-based device comprising:

a) a mechanism enabling movement of the brain-based device in a real-world environment;

b) a simulated nervous system, being interactive with the real-world environment, for controlling said mechanism to cause the brain-based device to move in the real-world environment;

c) said simulated nervous system including a model of the cerebellum having synapses which are eligible for plasticity only after a given time interval to enable the model to predict motor control of said mechanism; and d) wherein the device has a real-world environment learning mode and a real-world environment post-learning mode to predict obstacles in the path of movement of the device, wherein, during the learning mode, (i) at a time $t_o$, visual input to the brain-based device activates certain synapses of the cerebellum model above a threshold, said certain synapses are stored in a delay buffer, and activity of the cerebellum model is not strong enough to evoke a motor response to control said mechanism; and (ii) at a time $t_o$, subsequent to time $t_o$, the certain synapses stored in the buffer are eligible for synaptic change, an error signal is generated in response to an obstacle in the path of movement of the brain-based device, synaptic plasticity change of said certain synapses occurs in response to the error signal, and synaptic connections become strong enough to evoke a motor control of said mechanism to cause the brain-based device to move away from the obstacle.

5. A brain-based device according to claim 4, wherein, during the post-learning mode;

a) at a time $t_o$, visual input to the brain-based device activates certain synapses above a threshold, said certain synapses are stored in a delay buffer, activity of the cerebellum evokes a motor control response, and due to synaptic change occurring during the learning mode, causes the brain-based device to avoid the obstacle in its path before a collision; and b) during a time period subsequent to time $t_o$, no error signal is generated and no additional synaptic change occurs.

6. A brain-based device, according to claim 5, wherein said model of said cerebellum comprises precerebellum nuclei (PN) and a cerebellar cortex having Purkinje cells (PC) and deep cerebellar nuclei (DCN), and an inferior olive (IO), wherein said precerebellar nuclei outputs to said cerebellar cortex, said Purkinje cells (PC) inhibit said deep cerebellar nuclei (DCN) for turning and velocity control of the brain-based device, and said interior olive (IO) simulates climbing fiber input to said cerebellar cortex.

7. A brain-based device, according to claim 6, wherein said simulated nervous system further comprises a visual cortical area (MT) for providing input to said Purkinje cells (PC).

8. A brain-based device, according to claim 7, wherein said mechanism comprises a camera for providing visual input to said visual cortical area (MT).

9. A brain-based device, according to claim 8, wherein said mechanism comprises detectors for providing turn and velocity input to said inferior olive (IO).

10. A brain-based device, according to claim 9, wherein said mechanism comprises a motor and wheels driven by said motor, and wherein said motor receives input from said deep cerebellar nuclei (DCN) and from said inferior olive (IO) to control the turning and velocity of the brain-based device.

11. A brain-based device, according to claim 10, wherein said given time interval is a fixed delay in the range of 2-4 seconds.

* * * * *